United States Patent
Ota et al.

(10) Patent No.: US 12,142,733 B2
(45) Date of Patent: Nov. 12, 2024

(54) BATTERY

(71) Applicant: PRIME PLANET ENERGY & SOLUTIONS, INC., Tokyo (JP)

(72) Inventors: Masato Ota, Kobe (JP); Kodai Shintani, Toyota (JP); Kazuya Ikeshita, Minamiawaji (JP); Takashi Hosokawa, Kako-gun (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 460 days.

(21) Appl. No.: 17/517,092

(22) Filed: Nov. 2, 2021

(65) Prior Publication Data

US 2022/0149439 A1    May 12, 2022

(30) Foreign Application Priority Data

Nov. 10, 2020 (JP) .................. 2020-187462

(51) Int. Cl.
| | |
|---|---|
| *H01M 10/0587* | (2010.01) |
| *H01M 10/04* | (2006.01) |
| *H01M 10/0585* | (2010.01) |
| *H01M 50/103* | (2021.01) |
| *H01M 50/533* | (2021.01) |
| *H01M 50/54* | (2021.01) |

(52) U.S. Cl.
CPC ... *H01M 10/0587* (2013.01); *H01M 10/0431* (2013.01); *H01M 10/0585* (2013.01); *H01M 50/103* (2021.01); *H01M 50/533* (2021.01); *H01M 50/54* (2021.01); *H01M 2220/20* (2013.01)

(58) Field of Classification Search
CPC .......... H01M 10/0587; H01M 50/533; H01M 50/54; H01M 50/103; H01M 10/0431; H01M 10/0585; H01M 2220/20
USPC ........................................................ 429/94
See application file for complete search history.

(56) References Cited

U.S. PATENT DOCUMENTS

| | | | |
|---|---|---|---|
| 2009/0239133 A1 | 9/2009 | Kosugi | |
| 2013/0266845 A1 | 10/2013 | Kanda et al. | |
| 2017/0125778 A1* | 5/2017 | Iwasa | ................... H01M 50/533 |
| 2019/0044124 A1* | 2/2019 | Kawate | ............. H01M 10/0431 |

(Continued)

FOREIGN PATENT DOCUMENTS

| | | |
|---|---|---|
| CN | 1444303 A | 9/2003 |
| CN | 103367695 A | 10/2013 |

(Continued)

*Primary Examiner* — Jonathan G Jelsma
*Assistant Examiner* — Omar M Kekia
(74) *Attorney, Agent, or Firm* — Finnegan, Henderson, Farabow, Garrett and Dunner, LLP

(57) ABSTRACT

The battery disclosed here comprises one or more wound electrode bodies each composed of a strip-shaped first electrode plate and a strip-shaped second electrode plate superimposed and wound together with a strip-shaped separator between the two, and a battery case containing the wound electrode body or bodies. The first electrode plate has multiple electrode tabs protruding from an edge extending in the longitudinal direction, and the multiple electrode tabs include a first electrode tab having a straight part that is roughly perpendicular to the edge and has a length of at least 2 mm in the direction orthogonal to the edge, and second electrode tabs lacking the straight part.

11 Claims, 15 Drawing Sheets

(56) References Cited

U.S. PATENT DOCUMENTS

2020/0373546 A1\* 11/2020 Li ..................... H01M 50/534
2023/0091100 A1\* 3/2023 Tsushima ............ H01M 50/536
429/179

FOREIGN PATENT DOCUMENTS

| | | |
|---|---|---|
| JP | 46-036018 B | 10/1971 |
| JP | 2004-031144 A | 1/2004 |
| JP | 2009-129553 A | 6/2009 |
| JP | 4449279 B2 | 4/2010 |
| JP | 5127271 B2 | 1/2013 |
| JP | 2019-046592 A | 3/2019 |
| WO | WO 03/077348 A1 | 9/2003 |

\* cited by examiner

BATTERY

CROSS-REFERENCE TO RELATED APPLICATIONS

The priority claim for this application is based on Japanese Patent Application No. 2020-187462 submitted on Nov. 10, 2020, and the entire contents of that application are herein incorporated by reference.

BACKGROUND OF THE INVENTION

1. Field of the Invention

The present teaching relates to a battery.

2. Description of the Related Art

In certain known conventional batteries, a strip-shaped positive electrode having a positive electrode active material layer on a positive electrode current collector and a strip-shaped negative electrode having a negative active material on a negative electrode current collector are laid over each other with a strip-shaped separator in between and wound in the lengthways direction. Examples of prior art include Japanese Patent No. 5127271, Japanese Patent No, 4449279, and Japanese Patent Application Publication No. 2009-129553. For example, Japanese Patent No. 5127271 describes providing multiple electrode tabs with isosceles trapezoidal shapes on an edge of a strip-shaped electrode plate (positive electrode plate and/or negative electrode plate) extending in the longitudinal direction, winding the electrode plate so that the multiple electrode tabs are superimposed, and then electrically connecting this to an electrode terminal.

Such an electrode plate is prepared for example by a manufacturing method comprising a step of intermittently excising the edge of the current collector to form multiple electrode tabs on the electrode plate, and a winding step in which the electrode plate is wound around a winding core and cut to a predetermined length (winding length). In the winding step, the electrode plate may be cut using a cutting unit provided with a detection mechanism that detects the positions of the electrode tabs on the electrode plate with a laser for example and a cutting part that cuts the electrode plate at a cutting position separated by exactly the predetermined winding length based on the positions of the electrode tabs in the longitudinal direction as detected by the detection mechanism.

However, the inventors' research has shown that "winding error" occurs during the winding step. This is explained with reference to FIG. 18. FIG. 18 is a schematic plane view of the winding step. The electrode plate 102 shown in FIG. 18 has multiple electrode tabs 102*t* with isosceles trapezoidal shapes. In FIG. 18, the second and subsequent electrode tabs 102*t* in the longitudinal direction W of the electrode plate 102 are not shown. The legs of the isosceles trapezoidal electrode tab 102*t* (sides in the height direction Y perpendicular to the longitudinal direction W) are inclined with respect to the longitudinal direction W. Thus, as shown by the virtual line in FIG. 18, if the electrode plate 102 moves in the height direction Y perpendicular to the longitudinal direction W as the electrode plate 102 is being wound, the resulting winding error changes the position of the electrode tab 102*t* detected by the laser. The cutting position of the electrode plate 102 is shifted as a result, so that the cutting position differs between the cutting position (1) and the cutting position (2). As a result, the positions of the electrode tabs 102*t* vary when the multiple electrode tabs 102*t* are superimposed by winding, making it difficult to establish an electrical connection to the electrode terminal (for example, through a welded joint with a current collector part interposed between the tabs and the electrode terminal.

In light of these circumstances, it is an object of these teachings to provide a battery in which variation in the positions of multiple electrode tabs after winding has been suppressed.

These teachings provide a battery comprising one or more wound electrode bodies each comprising a strip-shaped first electrode plate and a strip-shaped second electrode plate stacked with a strip-shaped separator in between and wound, together with a battery case containing the wound electrode body or bodies. The first electrode plate has multiple electrode tabs protruding from an edge extending in the longitudinal direction. These multiple electrode tabs include a first electrode tab having a straight part that is roughly perpendicular to the edge and has a length of at least 2 mm in a direction orthogonal to the edge, and second electrode tabs lacking the straight part.

In these teachings, the electrode plate has the first electrode tab having the straight part in addition to the second electrode tabs. The result is that when winding error occurs because the electrode plate moves in a direction that intersects the longitudinal direction during winding, this is less likely to change the position of the electrode tabs as detected by, the detection mechanism. Thus, the electrode body can be cut in a relatively accurate position in comparison with configurations having only electrode tabs with isosceles trapezoidal shapes. It is thus possible to suppress variation in the positions of the multiple tabs after winding.

In a preferred embodiment of the battery disclosed here, at least one of the second electrode tabs is longer than the first electrode tab in the direction orthogonal to the longitudinal direction, and the base of this tab contiguous with the edge is also longer than the base of the first electrode tab in the longitudinal direction. The strength of the second electrode tabs can be improved with such a configuration. It is also possible to secure an adequate conductive joint between the electrode terminal and the second electrode tabs. For example, a large area for welding can be secured on the second electrode tabs. It is thus possible to reduce electrical resistance between the electrode terminal and the second electrode tabs. The ends of the electrode tabs can also be aligned more easily when the multiple electrode tabs are bundled and folded together after winding. It is thus possible to increase the storage capacity of the battery case and decrease battery size.

In a preferred embodiment of the battery disclosed here, at least one of the second electrode tabs is shorter than the first electrode tab in the direction orthogonal to the longitudinal direction, and the base of this tab contiguous with the edge is also shorter than the base of the first electrode tab in the longitudinal direction. The strength of the first electrode tab can be improved with such a configuration. It is also possible to secure an adequate conductive joint between the first electrode tab and the electrode terminal even when the first electrode tab has a straight part. For example, a large area for welding can be secured on the first electrode tab. It is thus possible to reduce electrical resistance between the electrode terminal and the first electrode tab. This also makes it easier to align the ends of the electrode tabs when the multiple electrode tabs are bundled and folded together after winding. It is thus possible to increase the storage capacity of the battery case and decrease battery size.

In a preferred embodiment of the battery disclosed here, the first electrode tab has a non-symmetrical shape in the longitudinal direction. The strength of the first electrode tab can be improved with such a configuration. It is also possible to secure an adequate conductive joint between the first electrode tab and the electrode terminal even when the first electrode tab has a straight part. For example, a large area for welding can be secured on the first electrode tab. It is thus possible to reduce electrical resistance between the electrode terminal and the first electrode tab.

In a preferred embodiment of the battery disclosed here, the first electrode tab has an inclined or curved part that is inclined relative to the straight part and is located between the straight part and the base contiguous with the edge in the direction perpendicular to the longitudinal direction. With such a configuration, for example stress is less likely to accumulate at the base when forming the first electrode tab and winding the electrode plate, and breakage is less likely near the base. The strength of the first electrode tab can be improved as a result. A stable electrical connection with the electrode terminal can also be maintained even when the battery is subjected to shock and vibration during use, and the connective reliability of the battery can be improved.

In a preferred embodiment of the battery disclosed here, the length of the first electrode tab from the base to the straight part is at least 4 mm. With such a configuration, for example stress is less likely to accumulate at the base when forming the first electrode tab and winding the electrode plate, and breakage is less likely near the base. The strength of the first electrode tab can be improved as a result. A stable electrical connection with the electrode terminal can also be maintained even when the battery is subjected to shock and vibration during use, and the connective reliability of the battery can be improved.

In a preferred embodiment of the battery disclosed here, given line La as a straight line extending in the longitudinal direction and passing through one end of the straight part in the protruding direction of the first electrode tab and line Lb as a straight line extending in the longitudinal direction and passing through the other end of the straight part in the protruding direction of the first electrode tab, the first electrode tab has a region between the line La and the line Lb that is at least 10 mm long in the longitudinal direction and at least 3 mm long in the direction perpendicular to the longitudinal direction. With such a configuration, it is possible to secure an adequate conductive joint between the first electrode tab and the electrode terminal even though the first electrode tab has a straight part. For example, a large area for can be secured on the first electrode tab. It is thus possible to reduce electrical resistance between the electrode terminal and the first electrode tab.

In a preferred embodiment of the battery disclosed here, the battery case comprises an exterior housing having a bottom wall, a pair of first side walls extending from the bottom wall and facing each other, a pair of second side walls extending from the bottom wall and facing each other, and an opening facing the bottom wall, together with a seal plate that seals the opening in the exterior housing, and is also provided with an electrode terminal Fixed to the seal plate and a current collector part that electrically connects the electrode terminal with the first electrode tab. The multiple electrode tabs are superimposed at the end of the wound electrode body in the direction extending along the first side walls, and the current collector part has a tab connection surface where the first electrode tab is connected at the end in the direction extending along the first side walls. With such a configuration, it is possible to maintain a stable electrical connection with the electrode terminal and improve the connective reliability of the battery.

In a preferred embodiment of the battery disclosed here, there are multiple wound electrode bodies. With these teachings, it is possible to charge and discharge multiple wound electrode bodies in a balanced fashion, and to achieve excellent cycle characteristics even with multiple wound electrode bodies.

In a preferred embodiment of the battery disclosed here, the number of the electrode tabs relative to the number of superimpositions of the first electrode plate is at least 0.8. With such a configuration internal resistance can be reduced at a high level and the output characteristics of the battery can be improved.

DETAILED DESCRIPTION OF THE PREFERRED EMBODIMENTS

Certain preferred embodiments of the technology disclosed here are explained below with reference to the drawings. Matters not specifically mentioned in the Description that are necessary for implementing the technology disclosed here (such as ordinary battery configurations and manufacturing processes that are not features of the technology disclosed here) can be understood as design matters by a person skilled in the art based on prior art in the field. The technology disclosed here can be implemented based on the contents disclosed in this Description and on technical common knowledge in the field. In this Description, notations of "A to B" indicating ranges mean at least A but not more than B but may include the meaning of "preferably more than A" and "preferably less than B".

In this Description, "battery" is a general term for storage devices from which electrical energy can be extracted, a concept that encompasses both primary and secondary batteries. In this Description, "secondary battery" is a general term for storage devices that can be repeatedly charged and discharged, a concept that encompasses so-called storage batteries (chemical batteries) such as lithium ion secondary batteries and nickel-hydrogen batteries as well as capacitors (physical batteries) such as electrical double-layer capacitors.

Battery 100

Figure 1:
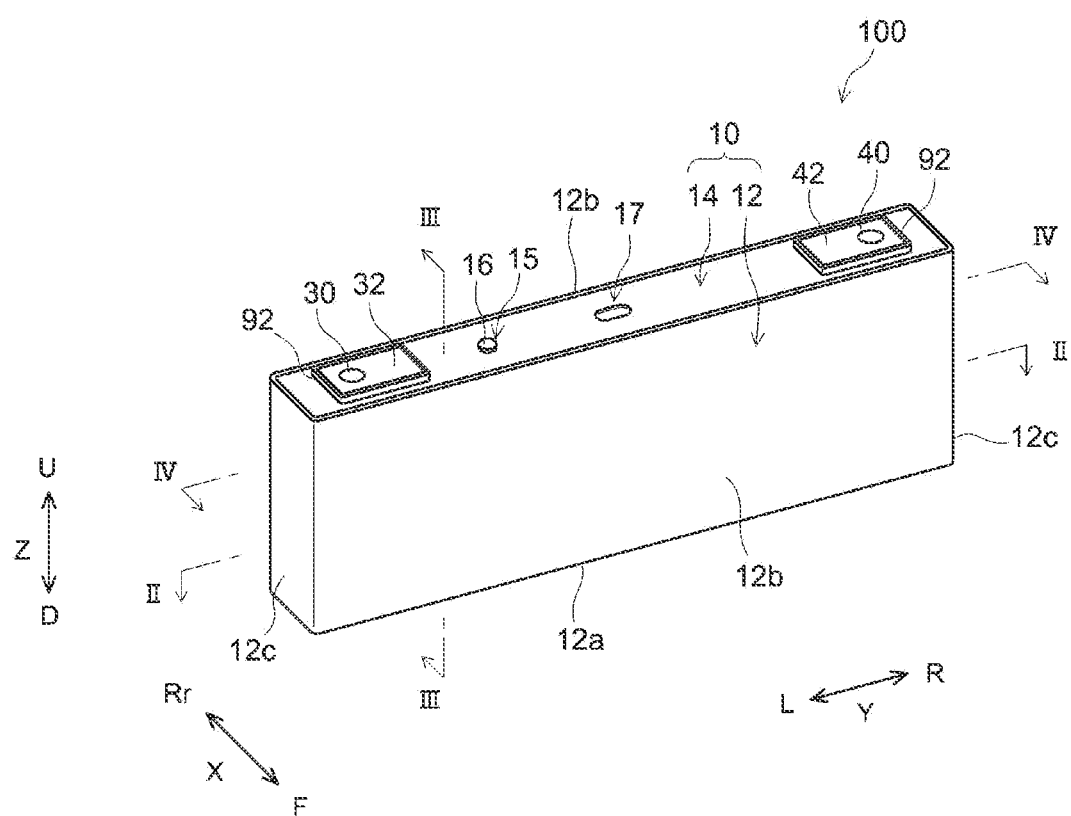
FIG. 1 is a schematic perspective view of a battery of one embodiment.
Figure 2:
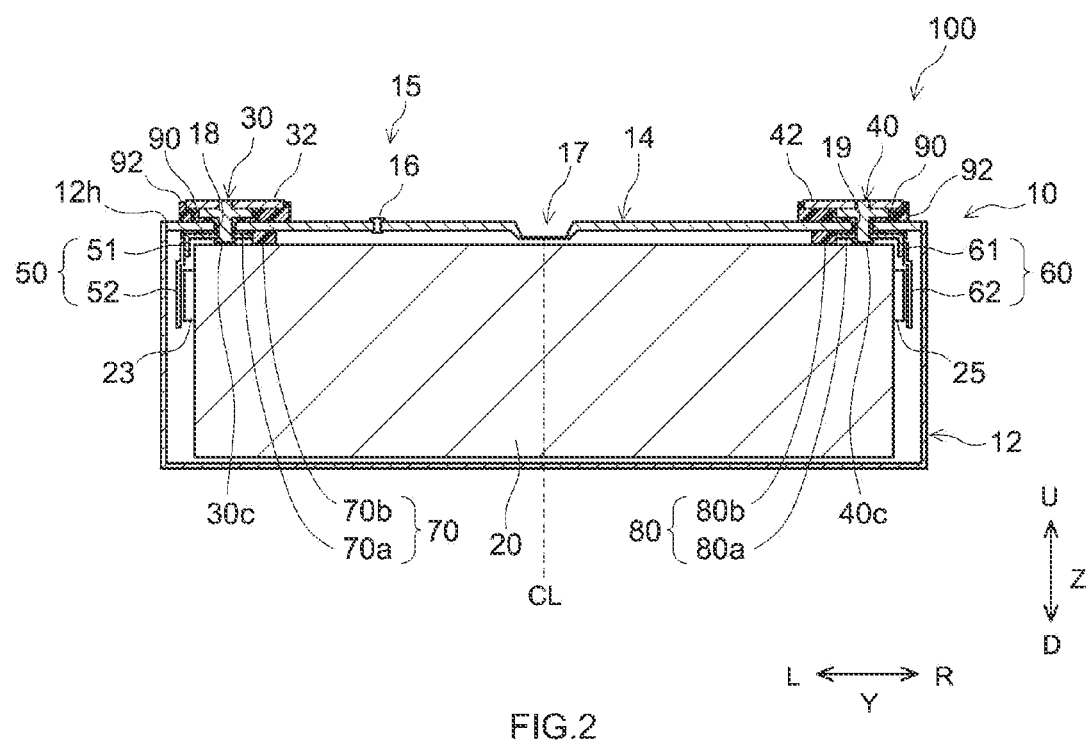
FIG. 2 shows a schematic vertical section along the II-II line in FIG. 1.
Figure 3:
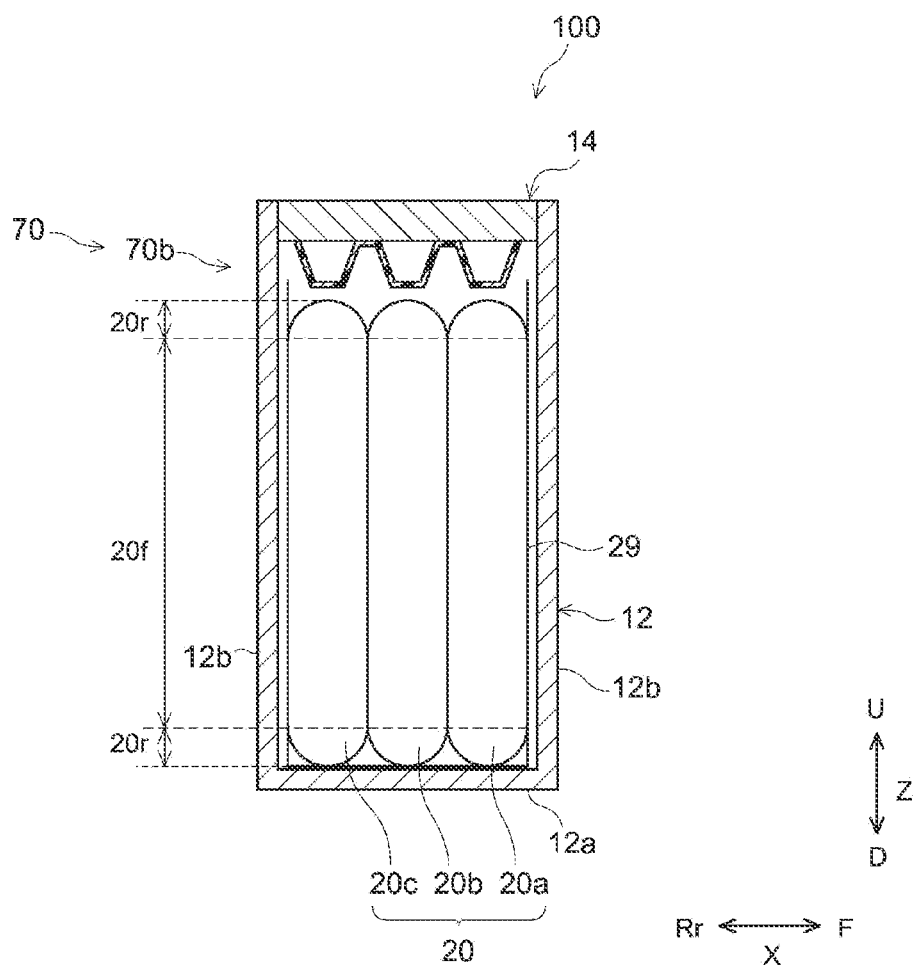
FIG. 3 shows a schematic vertical section along the III-III line in FIG. 1.
Figure 4:
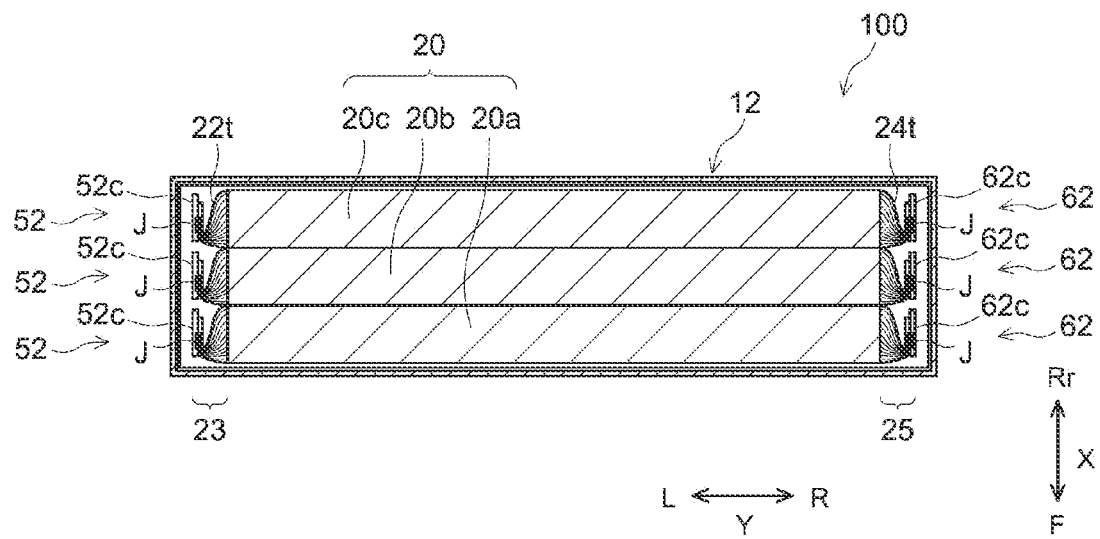
FIG. 4 shows a schematic horizontal section along the IV-IV line in FIG. 1.

FIG. 1 is a perspective view of a battery 100, FIG. 2 shows a schematic vertical section along the II-II line in FIG. 1. FIG. 3 shows a schematic vertical section along the III-III line in FIG. 1, FIG. 4 shows a schematic horizontal section along the IV-IV line in FIG. 1. In the following explanations, the symbols L, R, F, Rr, U and D in the figures indicate left, front, reverse, up and down, respectively, while the symbols X, Y and Z indicate the short-side direction, the long-side direction orthogonal to the short side direction, and the vertical direction of the battery 100, respectively. However, these directions are only for purposes of explanation, and do not limit the mode of installation of the battery 100.

As shown in FIG. 2, the battery 100 is provided with a battery case 10, an electrode body group 20, a positive electrode terminal 30, a negative electrode terminal 40, a positive electrode collector part 50, a negative electrode collector part 60, a positive electrode insulating member 70, and a negative electrode insulating member 80. The battery 100 is also provided with an electrolytic solution, but this is not shown. The battery 100 here is a lithium-ion secondary battery.

The battery case 10 is a housing for containing the electrode body group 20. The external shape of the battery case 10 here is a flat rectangular parallelepiped (square) shape with a bottom. A conventional material may be used for the battery case 10, without any particular limitations. The battery case 10 is preferably made of a metal, and is more preferably made of aluminum, aluminum alloy, iron or iron alloy or the like for example. As shown in FIG. 2, the battery case 10 comprises an exterior housing 12 having an opening 12h and a seal plate (lid) 14 that closes the opening 12h.

As shown in FIG. 1, the exterior housing 12 comprises a bottom wall 12a, a pair of long side walls 12b extending from the bottom wall 12a and facing each other, and a pair of short side walls 12c extending from the bottom wall 12a and facing each other. The bottom wall 12a is roughly rectangular. The bottom wall 12a faces the opening 12h. The areas of the short side walls 12c are smaller than the areas of the long side walls 12b. The long side walls 12b and the short side walls 12c are examples of the first side walls and second side walls.

The seal plate 14 is attached to the exterior housing 12 so as to close the opening 12h in the exterior housing 12. The seal plate 14 faces the bottom wall 12a of the exterior housing 12. The seal plate 14 has a roughly rectangular shape in plain view. In the battery case 10, the seal plate 14 may be joined (welded for example) to integrate it with the edge of the opening 12h of the exterior housing 12. The battery case 10 is airtightly sealed.

As shown in FIG. 2, the seal plate 14 is provided with a liquid injection hole 15, a gas discharge valve 17, and two terminal outlet holes 18 and 19. The liquid injection hole 15 is for purposes of injecting an electrolytic solution after the seal plate 14 has been attached to the exterior housing 12. The liquid injection hole 15 is sealed by a seal member 16. The gas discharge valve 17 is configured to be broken when the pressure inside the battery case 10 exceeds a predetermined value, discharging gas outside the battery case 10. The terminal outlet holes 18 and 19 are formed at either end of the seal plate 14 in the long-side direction Y. The terminal outlet holes 18 and 19 penetrate the seal plate 14 in the vertical direction Z. The terminal outlet holes 18 and 19 each have an internal diameter large enough to allow insertion of the positive electrode terminal 30 and negative electrode terminal 40, respectively, before these are attached to the seal plate 14 (before riveting).

The positive electrode terminal 30 and negative electrode terminal 40 are both fixed to the seal plate 14. The positive electrode terminal 30 is disposed on one side (left side in FIGS. 1 and 2) in the long-side direction Y of the seal plate 14. The negative electrode terminal 40 is disposed on the other side (right side in FIGS. 1 and 2) in the long-side direction Y of the seal plate 14. As shown in FIG. 1, the positive electrode terminal 30 and negative electrode terminal 40 are exposed on the outer surface of the seal plate 14. As shown in FIG. 2, the positive electrode terminal 30 and negative electrode terminal 40 penetrate the terminal outlet holes 18 and 19 and extend outside the interior of the seal plate 14, The positive electrode terminal 30 and negative electrode terminal 40 here are attached to the surrounding edges of the terminal outlet holes 18 and 19 of the seal plate 14 by riveting, Rivet tails 30c and 40c are formed on the ends of the positive electrode terminal 30 and negative electrode terminal 40 on the exterior housing 12 side (lower ends in FIG. 2). The positive electrode terminal 30 and negative electrode terminal 40 are examples of electrode terminals.

As shown in FIG. 2, the positive electrode terminal 30 is electrically connected inside the exterior housing 12 to a positive electrode 22 (see FIG. 7) of an electrode body group 20 via a positive electrode collector part 50, The positive electrode terminal 30 is insulated from the seal plate 14 by a positive electrode insulating member 70 and a gasket 90. The positive electrode terminal 30 is preferably made of metal and is more preferably made of aluminum or aluminum alloy for example.

The negative electrode terminal 40 is electrically connected inside the exterior housing 12 to a negative electrode 24 (see FIG. 7) of an electrode body group 20 via a negative electrode collector part 60. The negative electrode terminal 40 is insulated from the seal plate 14 by a negative electrode insulating member 80 and a gasket 90. The negative electrode terminal 40 is preferably made of metal and is more preferably made of copper or copper alloy for example. The negative electrode terminal 40 may also be composed of two conductive members joined and integrated together. For example, the part that connects to the negative electrode collector part 60 may be made of copper or copper alloy, while the part exposed on the outer surface of the seal plate 14 may be made of aluminum or aluminum alloy.

As shown in FIG. 1, a plate-shaped positive electrode external conduction member 32 and a negative electrode external conduction member 42 are attached to the outer surface of the seal plate 14. The positive electrode external conduction member 32 is electrically connected to the positive electrode terminal 30. The negative electrode external conduction member 42 is electrically connected to the negative electrode terminal 40. The positive electrode external conduction member 32 and negative electrode external conduction member 42 are members to which bus bars are attached when multiple batteries 100 are electrically connected to each other. The positive electrode external conduction member 32 and negative electrode external conduction member 42 are preferably made of metal and are more preferably made of aluminum or aluminum alloy for example. The positive electrode external conduction member 32 and negative electrode external conduction member 42 are insulated from the seal plate 14 by an external insulating member 92. However, the positive electrode external conduction member 32 and negative electrode external conduction member 42 are not essential and may be omitted in other embodiments.

Figure 5:
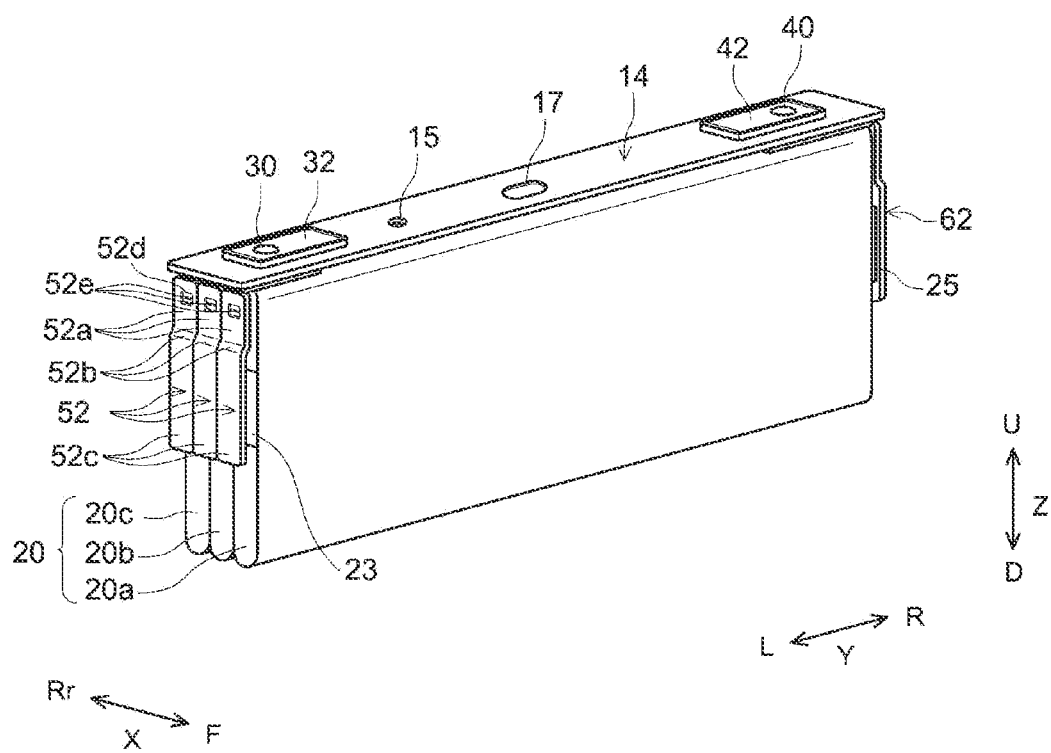
FIG. 5 is a schematic perspective view showing an electrode body group attached to a seal plate.

FIG. 5 is a perspective view showing an electrode body group 20 attached to a seal plate 14. The electrode body group 20 shown here comprises three wound electrode bodies 20a, 20b, and 20c. With the technology disclosed here, excellent cycle characteristics can be achieved because the multiple wound electrode bodies 20a, 20b, and 20c can be charged and discharged in a balanced fashion. However, the number of wound electrode bodies installed inside a single exterior housing 12 is not particularly limited and may be two or more (multiple) or one. An electrode body holder 29 (see FIG. 3) made of a resin sheet covers the electrode body group 20 installed inside the exterior housing 12 here.

Figure 6:
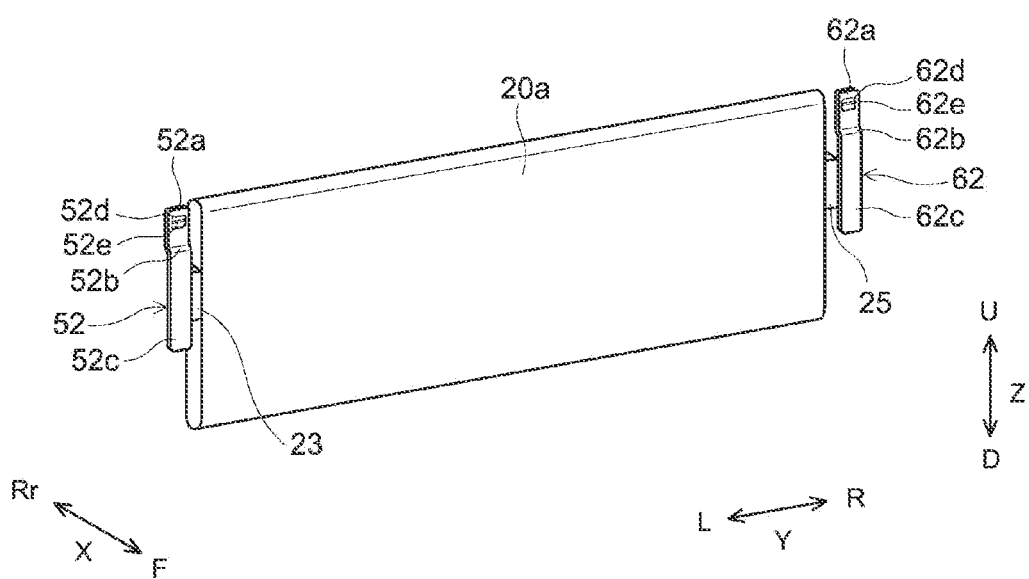
FIG. 6 is a schematic perspective view of an electrode body with a positive electrode second collector part and a negative electrode second collector part attached thereto.
Figure 7:
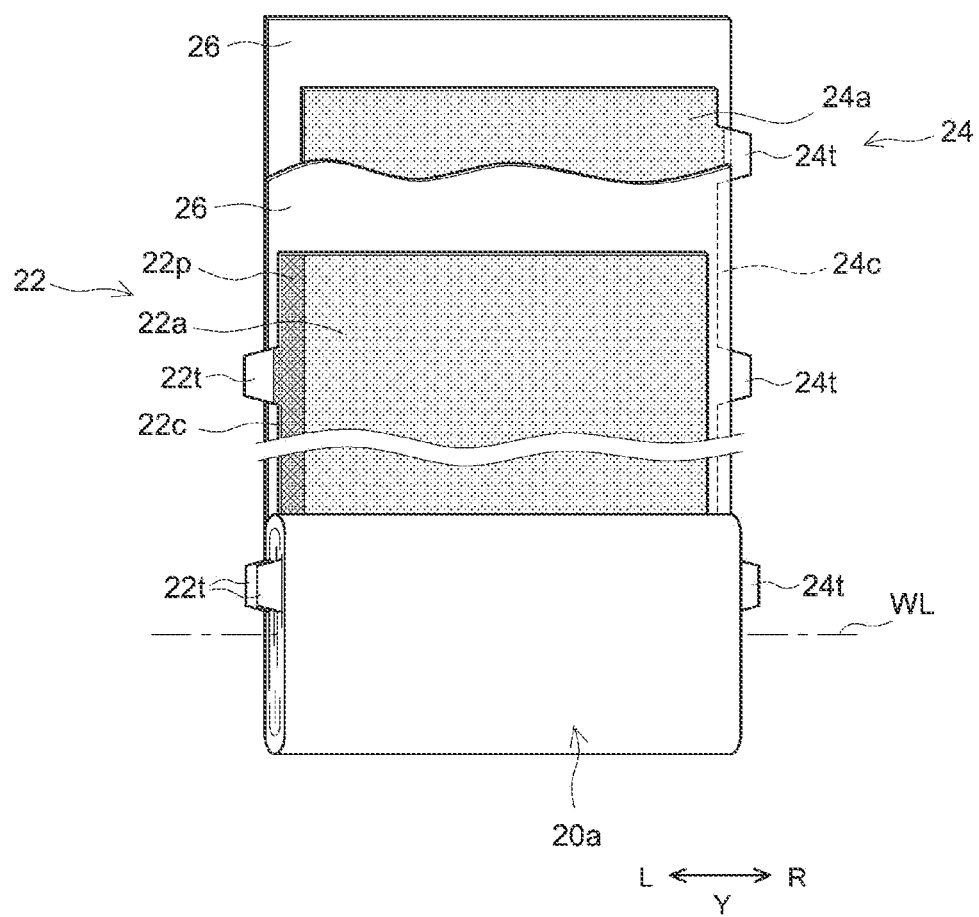
FIG. 7 is a schematic view showing the configuration of a wound electrode body.

FIG. 6 is a schematic perspective view of the wound electrode body 20a. FIG. 7 is a schematic view showing the configuration of the wound electrode body 20a. The detailed explanations below pertain to the example of the wound electrode body 20a, but the wound electrode bodies 20b and 20c may also be configured in the same way.

The wound electrode body 20a has a positive electrode 22, a negative electrode 24 and a separator 26. The wound electrode body 20a here is configured with the strip-shaped positive electrode 22 and strip-shaped negative electrode 24 superimposed with two strip-shaped separators 26 in between and wound around a winding axis WL. The wound electrode body 20a has a flat shape. The wound electrode body 20a is disposed inside the exterior housing 12 so that the winding axis WL is roughly parallel to the long-side direction Y. As shown in FIG. 3, the wound electrode body 20a has a pair of curved parts (R parts) 20r facing the seal plate 14 and the bottom wall 12a of the exterior housing 12, and a pair of straight parts 20f connecting the curved parts 20r and facing the long side walls 12b of the exterior housing 12. The straight parts 20f extend along the long side walls 12b.

As shown in FIG. 7, the positive electrode 22 has a positive electrode current collector 22c, together with a positive electrode active material layer 22a and a positive electrode protective layer 22p fixed to at least one of the surfaces of the positive electrode current collector 22c. However, the positive electrode protective layer 22p is not essential, and may be omitted in other embodiments. The positive electrode current collector 22c is strip shaped. The positive electrode current collector 22c is made of a conductive metal such as aluminum, aluminum alloy, nickel, stainless steel, or the like for example. The positive electrode current collector 22c here is a metal foil, specifically an aluminum foil. The positive electrode 22 is one example of the first electrode plate or second electrode plate.

Multiple positive electrode tabs 22t are provided at one end of the positive electrode current collector 22c in the long-side direction Y (left end in FIG. 7). The multiple positive electrode tabs 22t protrude at one end in the long-side direction Y (left end in FIG. 7). The multiple positive electrode tabs 22t protrude beyond the separators 26 in the long-side direction Y. The multiple positive electrode tabs 22t are provided at intervals (intermittently) in the longitudinal direction of the positive electrode 22. However, the positive electrode tabs 22t may be provided instead at the other end in the long-side direction Y (right end in FIG. 7), or on both ends in the long-side direction Y. The positive electrode tabs 22t form part of the positive electrode current collector 22c and are made of metal foil (aluminum foil). The positive electrode protective layer 22p is formed on parts of the positive electrode tabs 22t, specifically on an area closer to the base than the straight line Lb on the detection tab 27 and an area near the base on the normal tabs 28a to 28e as discussed below. No positive electrode active material layer 22a or positive electrode protective layer 22p is formed on at least part of the positive electrode tabs 22t, where the positive electrode current collector 22c is consequently exposed. The positive electrode tabs 22t are examples of electrode tabs.

As shown in FIG. 4, the multiple positive electrode tabs 22t are superimposed at one end in the long-side direction Y (left end in FIG. 4) to constitute a positive electrode tab group 23. The multiple positive electrode tabs 22t are bent and curved so that the outer ends are aligned. It is thus possible to improve the storage capacity of the battery case 10 and decrease the size of the battery 100. The positive electrode tab group 23 is electrically connected to the positive electrode terminal 30 via the positive electrode collector part 50. The multiple positive electrode tabs 22t are preferably bent and connected electrically to the positive electrode terminal 30. A positive electrode second collector part 52 (described below) is attached to the positive electrode tab group 23.

As shown in FIG. 7, the positive electrode active material layer 22a is provided in a strip shape in the longitudinal direction of the strip-shaped positive electrode current collector 22c. The positive electrode active material layer 22a contains a positive electrode active material (for example, a lithium-transition metal composite oxide such as a lithium-nickel-cobalt-manganese composite oxide) capable of reversibly storing and releasing a charge carrier. Given 100 mass % as the total solids of the positive electrode active material layer 22a, the positive electrode active material may constitute roughly at least 80 mass %, or typically at least 90 mass %, such as at least 95 rums % of the total solids. The positive electrode active material layer 22a may also contain optional components in addition to the positive electrode active material, such as for example a conductive material, a binder, and various additives and the like. A carbon material such as acetylene black (AB) for example may be used as the conductive material. Polyvinylidene fluoride ° NH) or the like may be used as the binder for example.

As shown in FIG. 7, the positive electrode protective layer 22p is provided at the boundary of the positive electrode current collector 22c and the positive electrode active material layer 22a in the long-side direction Y. The positive electrode protective layer 22p here is provided at one end (left end in FIG. 7) of the positive electrode current collector 22c in the long-side direction Y. However, the positive electrode protective layer 22p may also be provided at both ends in the long-side direction Y. The positive electrode protective layer 22p is provided as a strip extending along the positive electrode active material layer 22a. The positive electrode protective layer 22p contains an inorganic filler (such as alumina). Given 100 mass % as the total solids of the positive electrode protective layer 22p, the inorganic filler constitutes roughly at least 50 mass %, or typically at least 70 mass %, or for example at least 80 mass % of the total solids. The positive electrode protective layer 22p may also contain optional components in addition to the inorganic filler, such as for example a conductive material, a binder, and various additives and the like. The conductive material and binder may be the same materials given as examples in the positive electrode active material layer 22a.

Figure 8:
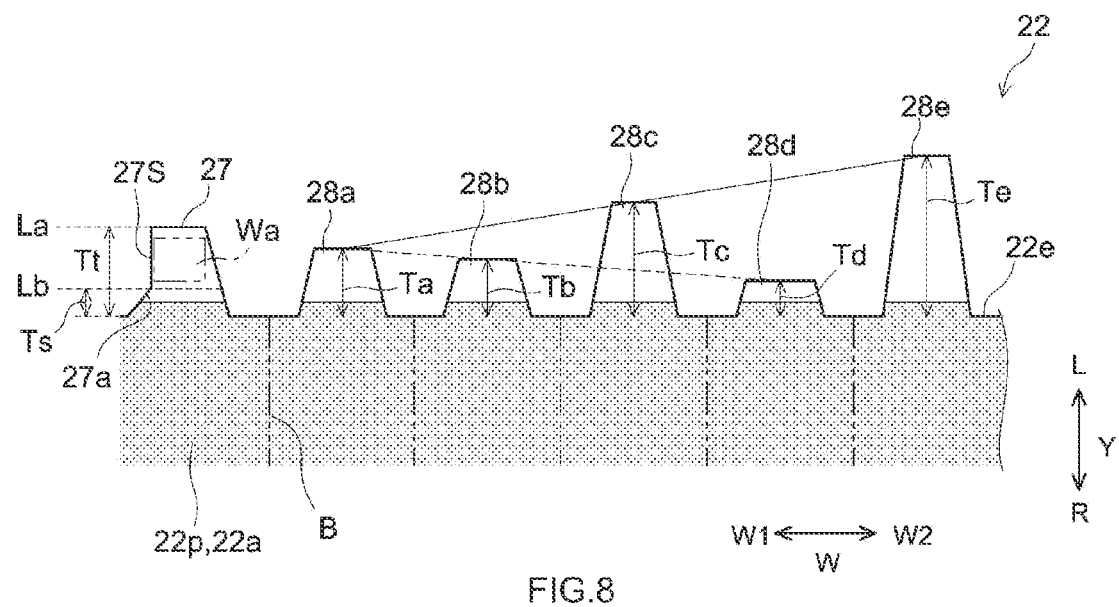
FIG. 8 is a schematic plane view of a positive electrode of one embodiment.

FIG. 8 is a schematic plane view of the positive electrode 22. In the explanations below, the symbols W and Y in FIG. 8 indicate the longitudinal direction of the positive electrode 22 and the height direction perpendicular to the longitudinal direction of the positive electrode 22, respectively. The longitudinal direction W corresponds to the winding direction of the wound electrode body 20a. The symbols W1 and W2 represent the leading end and the trailing end in the winding direction. The height direction Y is the protrusion direction of the detection tab 27 and corresponds to the long-side direction Y of the battery 100. The symbol B represents a bending point where the electrode is bent to form a curved part 20r during the winding step (described below). The following detailed explanations pertain to the example of a positive electrode 22, but the same configuration may also be applied to a negative electrode 24 (specifically, the negative electrode tabs 24t described below).

As shown in FIG. 8, the positive electrode 22 has an edge 22e extending in the longitudinal direction W. The multiple positive electrode tabs 22t protrude from the edge 22e of the positive electrode 22 on one side in the height direction Y (top in FIG. 8). The multiple positive electrode tabs 22t include a detection tab 27 having a predetermined straight part 27S, and multiple normal tabs 28a to 28e lacking the straight part 27S. In this case there is one detection tab 27. However, there may also be 2 or more (multiple) detection tabs 27. Here there are multiple normal tabs 28a to 28e, but there may be only one detection tab 27. The detection tab 27 is one example of the first electrode tab having a straight part 27S, and the normal tabs 28a to 28e are examples of the second electrode tab lacking the straight part 27S.

One each of the multiple positive electrode tabs 22t is provided here in a space defined by the bending points B. That is, the number of positive electrode tabs 22t is the same as the number of superimpositions of the positive electrode 22 (1 tab/1 superimposition). When the positive electrode 22 is wound one turn around the winding axis WL in the winding step, the positive electrode tabs 22t are superimposed a total of two times on the front and hack side from the perspective of the winding axis WL, Thus, the number of positive electrode tabs 22t is 2 tabs/wind (turn), The number of positive electrode tabs 22t is preferably at least 0.5 relative to the number of superimpositions of the positive electrode 22 (0.5 tabs/1 superimposition), or preferably at least 0.8 (0.8 tabs/1 superimposition). With such a configuration, internal resistance can be reduced at a high level and the output characteristics of the battery can be improved.

The detection tab 27 is a part that is detected by a detection mechanism (such as a laser detector) and serves as a benchmark for determining the cutting position when the strip-shaped positive electrode 22 is cut to a predetermined winding length in the winding step (discussed below), As shown in FIG. 8, the detection tab 27 here is disposed at the front end (leading end W1) in the predetermined winding length in the longitudinal direction W of the positive electrode 22. Of the multiple positive electrode tabs 22t, the detection tab 27 is preferably positioned closest to the winding axis WL of the wound electrode body 20a. It is thus possible to minimize the positional error between the second positive electrode tab 22t (normal tab 28a here) and the trailing tab in the predetermined winding length to within a tolerance of about ±0.5 mm for example in the longitudinal direction W.

The detection tab 27 is preferably disposed at the front end (leading end W1) and/or the back end (trailing end W2) in the predetermined winding length. In other words, the detection tab 27 is preferably disposed as close as possible to the cutting position of the positive electrode 22. The positive electrode 22 can be cut accurately at the correct position if the detection tab 27 is near the cutting position. This also means that an effect on the winding speed can be avoided even if the winding speed of the positive electrode 22 increases between the beginning of winding and the middle stage in the winding step for example.

The detection tab 27 extends from a base contiguous with the edge 22e of the positive electrode 22. As long as it has a straight part 27S, the shape of the detection tab 27 is not particularly limited. The detection tab 27 may have a polygonal shape such as a pentagonal, rectangular, or triangular shape. The shape of the detection tab 27 here is pentagonal. Stress is thus less likely to accumulate at the base of the detection tab 27 and breakage is less likely near the base during formation of the detection tab 27 (for example, when removing scrap material produced by working the positive electrode current collector 22c) and the like. Tab bending of the detection tab 27 is also less likely to occur in the winding step. Furthermore, current is less likely to accumulate at the base of the detection tab 27, so it is possible to suppress heat concentration near the base and prevent an increase in resistance near the base when the battery 100 is charged and discharged.

The detection tab 27 here has an asymmetrical shape in the longitudinal direction W. This serves to increase the strength of the detection tab 27. A large area can also be secured on the detection tab 27 for welding with the positive electrode second collector part 52 (discussed below), and electrical resistance between the detection tab 27 and the positive electrode terminal 30 can be reduced. The length Tt of the detection tab 27 in the height direction Y (tab height) may be about 13 to 22 mm, or 17.5 mm for example.

Figure 18:
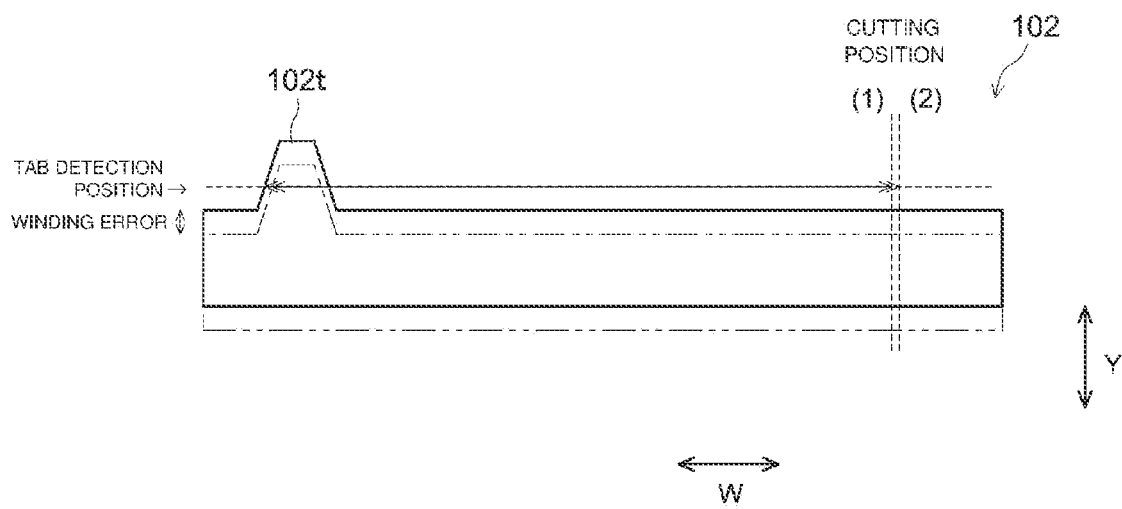
FIG. 18 is a schematic plane view of a winding step of prior art.

The straight part 27S is provided roughly perpendicular (90°±5°) to the edge 22e of the positive electrode 22. The angle of the straight part 27S relative to the edge 22e is preferably 90°±2°. If the detection tab 27 lacks a straight part 27S, the angle of the legs of the isosceles trapezoidal shape in FIG. 18 for example relative to the edge may be about 80°±2°. The length of the straight part 27S orthogonal to the edge 22e (which here is the same as the length in the height direction Y) is at least 2 mm. The effects of the technology disclosed here can thus be achieved appropriately even if the dimensional tolerance is about ±0.5 mm when working the positive electrode current collector 22c to form the detection tab 27 for example. The length of the straight part 27S is preferably from 3 to 20 mm, or more preferably from 5 to 1.5 mm (10±5 mm), The winding error tolerance can thus be kept within about ±1.0 mm.

The detection tab 27 preferably has an inclined part or curved part that is inclined relative to the straight part 27S in the height direction Y between the straight part 27S and the base contiguous with the edge 22e of the positive electrode 22. The detection tab 27 here has an inclined part 27a between the base and the straight part 27S. With such a configuration, the detection tab 27 is less likely to break near the base during formation of the detection tab 27 or when winding the positive electrode 22 for example, and the strength of the detection tab 27 can be increased. A stable electrical connection can also be maintained with the positive electrode terminal 30 even when the battery 100 is subjected to shock or vibration or the like during use, and the connective reliability of the battery 100 can be improved.

The length (height) Ts from the base to the straight part 27S in the height direction Y is preferably at least 4 mm. The effects described above can thus be obtained at a high level. The height Ts from the base to the straight part 27S is shorter than the tab height Tt of the detection tab 27. The height Is from the base to the straight part 27S is preferably at least 10% of the tab height Tt, or more preferably at least 15%, or still more preferably at least 20%. This makes tab breakage less likely during the winding step. Current is also less likely to accumulate at the base, and it is possible to suppress heat concentration near the base and prevent an increase in resistance near the base when the battery 100 is charged and discharged. The height Is from the base to the straight part 27S may be not more than about 50% of the tab height Tt, or not more than 30% for example. The height Ts from the base to the straight part 27S may also be longer than the length of the straight part 27S.

As shown in FIG. 8, the detection tab 27 has a region Wa between a straight line La and a straight line Lb, given La as a straight line extending in the longitudinal direction W and passing through one end of the straight part 27S in the height direction Y (top end in FIG. 8, which here is the same as the top end of the detection tab 27) and Lb as a straight line extending in the longitudinal direction W and passing through the other end of the straight part 27S in the height direction Y (lower end in FIG. 8), The region Wa is a site for the detection tab 27 to the positive electrode second collector part 52 (described below). The region Wa may be any region having a length of at least 10 mm in the longitudinal direction W and a height of at least 3 mm in the height direction Y. With such a configuration, an adequate conductive joint can be secured between the detection tab 27 and the positive electrode terminal 30, and electrical resistance can be reduced even if the detection tab 27 has the straight part 27S.

The normal tabs 28a to 28e here constitute the positive electrode tabs 22t beginning with the second tab in the predetermined winding length in the longitudinal direction W of the positive electrode 22, such as the second to the final positive electrode tabs 22t. The normal tabs 28a to 28e constitute the positive electrode tabs 22t other than the detection tab 27. The shapes of the normal tabs 28a to 28e are not particularly limited as long as they lack the straight part 27S. The normal tabs 28a to 28e may have a polygonal shape such as a rectangular or triangular shape, or a semicircular shape or the like. The normal tabs 28a to 28e may also have a trapezoidal shape such as an isosceles trapezoidal shape, a rectangular shape, a square shape, or the like for example. The normal tabs 28a to 28e may also have a symmetrical shape in the longitudinal direction W.

The normal tabs 28a to 28e preferably have a trapezoidal shape. Stress is thus less likely to accumulate at the base during formation of the normal tabs 28a to 28e, and breakage is less likely near the base. Tab bending is also less likely to occur in the winding step. Furthermore, current is less likely to accumulate at the base, so it is possible to suppress heat concentration near the base and prevent an increase in resistance near the base when charging and discharging the battery 100.

The sizes of the multiple normal tabs 28a to 28e (for example, tab length in longitudinal direction W and/or length (height) in height direction Y) may be the same or different. As shown in FIG. 8, the multiple normal tabs 28a to 28e have different sizes here.

In certain embodiments, at least one of the multiple normal tabs 28a to 28e preferably has a smaller tab height than the detection tab 27, and a shorter base length (base width) in the longitudinal direction W than the detection tab 27. It is thus possible to increase the strength of the detection tab 27. A large area Wa for welding can also be secured on the detection tab 27, and electrical resistance between the detection tab 27 and the positive electrode terminal 30 can be reduced. It also becomes easier to align the ends of the multiple positive electrode tabs 22t when they are bundled and folded together after winding.

Moreover, in certain embodiments at least one of the multiple normal tabs 28a to 28e preferably has a larger tab height than the detection tab 27, and a longer base length (base width) in the longitudinal direction W than the detection tab 27. It is thus possible to increase the strength of at least one of the normal tabs 28a to 28e. A large area Wa for welding can also be secured on at least one of the normal tabs 28a to 28e, and electrical resistance between the detection tab 27 and the positive electrode terminal 30 can be reduced. It also becomes easier to align the ends of the multiple positive electrode tabs 22t when they are bundled and folded together after winding.

As shown in FIG. 8, in the longitudinal direction W (in other words, the winding direction), the height Ta of the normal tab 28a located at the beginning of the multiple normal tabs 28a to 28e is the average of the tab heights of the multiple normal tabs 28a to 28e. The height Tb of the normal tab 28b located in the second position is smaller than the tab height Ta of the normal tab 28a The height Td of the normal tab 28d located in the fourth position is smaller than the tab height Tb of the normal tab 28b. Of the multiple normal tabs 28a to 28e, the normal tabs 28b and 28d located at even-numbered positions have tab heights Tb and Td that decrease gradually from the leading end W1 to the trailing end W2 in the longitudinal direction W. However, the height Tc of the normal tab 28c in the third position is greater than the tab height Ta of the normal tab 28a, The height Te of the normal tab 28e located in the fifth position is greater than the tab height Tc of the normal tab 28c. Of the multiple normal tabs 28a to 28e, the normal tabs 28c and 28e located at odd-number positions have tab heights Tc and Te that increase gradually from the leading end W1 to the trailing end W2 in the longitudinal direction W.

Figure 9:
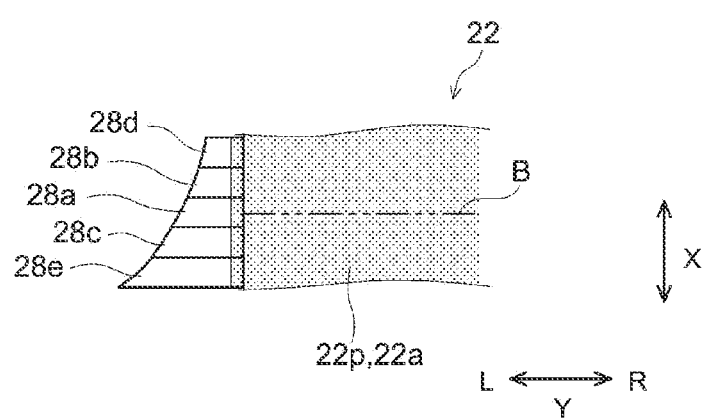
FIG. 9 is a schematic partial side view showing the positive electrode of FIG. 8 in a wound state.

FIG. 9 is a schematic partial side view showing the positive electrode 22 of FIG. 8 in a wound state. However, the detection tab 27 is not shown in FIG. 9. As shown in FIG. 9, when the positive electrode 22 is wound by bending at the bending points B, the lengths of the normal tabs 28a to 28e in the long-side direction Y increase gradually from one side to the other in the short-side direction X. This makes it possible to properly align the outer ends when the multiple normal tabs 28a to 28e are curved as shown in FIG. 4.

As shown in FIG. 7, the negative electrode 24 has a negative electrode current collector 24c, together with a negative electrode active material layer 24a fixed to at least one of the surfaces of the negative electrode current collector 24c. The negative electrode current collector 24c is strip shaped. The negative electrode current collector 24c is made of a conductive metal such as copper, copper alloy, nickel, or stainless steel. The negative electrode current collector 24c here is a metal foil, specifically a copper foil. The negative electrode 24 is one example of the first electrode plate second electrode plate.

Multiple negative electrode tabs 24t are provided at one end of the negative electrode current collector 24c in the long-side direction Y (right end in FIG. 7). The multiple negative electrode tabs 24t protrude beyond the separators 26 in the long-side direction Y. The multiple negative electrode tabs 24t are provided at intervals (intermittently) in the longitudinal direction of the negative electrode 24. The negative electrode tabs 24t protrude at one end in the long-side direction Y (right end in FIG. 7). However, the negative electrode tabs 24t may be provided instead at the other end in the long-side direction Y (left end in FIG. 7), or at both ends in the long-side direction Y. The negative electrode tabs 24t form part of the negative electrode current collector 24c and are made of metal foil (copper foil). The negative electrode active material layer 24a is formed on parts of the negative electrode tabs 24t. No negative electrode active materials layer 24a is formed on at least part of the negative electrode tabs 24t, where the negative electrode current collector 24c is consequently exposed. The negative electrode tabs 24t are examples of electrode tabs.

As shown in FIG. 4, the multiple negative electrode tabs 24t are superimposed at one end (right end in FIG. 6) in the long-side direction Y to constitute a negative electrode tab group 25. The negative electrode tab group 25 is provided at a position symmetrical to the positive electrode tab group 23 in the long-side direction Y. The multiple negative electrode tabs 24t are bent and curved so that the outer ends are aligned. It is thus possible to improve the storage capacity of the battery case 10 and decrease the size of the battery 100. The negative electrode tab group 25 is electrically connected to the negative electrode terminal 40 via the negative electrode collector part 60. The multiple negative electrode tabs 24t are preferably bent and connected electrically to the negative electrode terminal 40. A negative electrode second collector part 62 (described below) is attached to the negative electrode tab group 25. Like the multiple positive electrode tabs 22t, the multiple negative electrode tabs 24t have different sizes so that their outer ends can be aligned when they are curved.

As shown in FIG. 7, the negative electrode active material layer 24a is provided in a strip shape in the longitudinal direction of the strip-shaped negative electrode current collector 24c. The negative electrode active material layer 24a contains a negative electrode active material (for example, a carbon material such as graphite) capable of reversibly storing and releasing a charge carrier. Given 100 mass % as the total solids of the negative electrode active material layer 24a, the negative electrode active material may constitute roughly at least 80 mass %, or typically at least 90 mass %, such as at least 95 mass % of the total solids. The negative electrode active material layer 24a may also contain optional components in addition to the negative electrode active material, such as for example a binder, a dispersant, and various additives and the like. A rubber such as styrene-butadiene rubber (SBR) for example may be used as the binder. A cellulose material such as carboxymethyl cellulose (CMC) for example may be used as the dispersant.

The separators 26 are members that insulate the positive electrode active material layer 22a of the positive electrode 22 and the negative electrode active material layer 24a of the negative electrode 24. The separators 26 here constitute the outer surface of the wound electrode body 20a. A porous resin sheet of a polyolefin resin such as polyethylene (PE) or polypropylene (PP) is preferred for the separators 26. The separators 26 preferably have a base material made of a porous resin sheet and a heat resistance layer (HRL) formed on at least one surface of the base material. The heat resistance layer is a layer containing an inorganic filler. Alumina, boehmite, aluminum hydroxide, titania or the like may be used as the inorganic filler.

The electrolytic solution may be similar to conventional solutions, without any particular limitations. The electrolytic solution is for example a non-aqueous electrolytic solution containing a non-aqueous solvent and a supporting salt. The non-aqueous solvent contains for example a carbonate such as ethylene carbonate, dimethyl carbonate, or ethyl methyl carbonate. The supporting salt is for example a fluorine-containing lithium salt such as $LiPF_6$. However, the electrolyte may also be integrated with the electrode body group 20 in solid (solid electrolyte) form.

The positive electrode collector part 50 constitutes a conductive pathway electrically connecting the positive electrode terminal 30 with the positive electrode tab group 23 composed of multiple positive electrode tabs 22t. As shown in FIG. 2, the positive electrode collector part 50 is provided with a positive electrode first collector part 51 and a positive electrode second collector part 52. The positive electrode first collector part 51 and positive electrode second collector part 52 may be made of the same metal species as the positive electrode current collector 22c, such as for example a conductive metal such as aluminum, aluminum alloy, nickel, or stainless steel. The positive electrode collector part 50 is one example of the current collector part.

Figure 10:
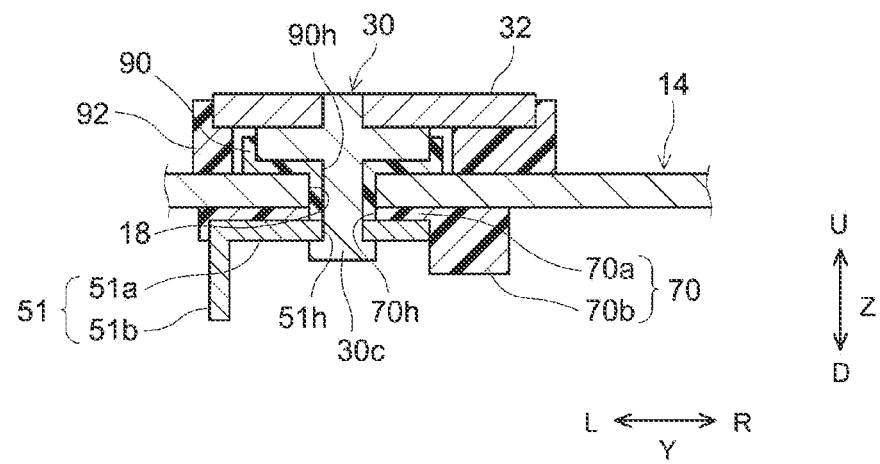
FIG. 10 is a schematic partial expanded section showing the vicinity of the positive electrode terminal of FIG. 2.
Figure 11:
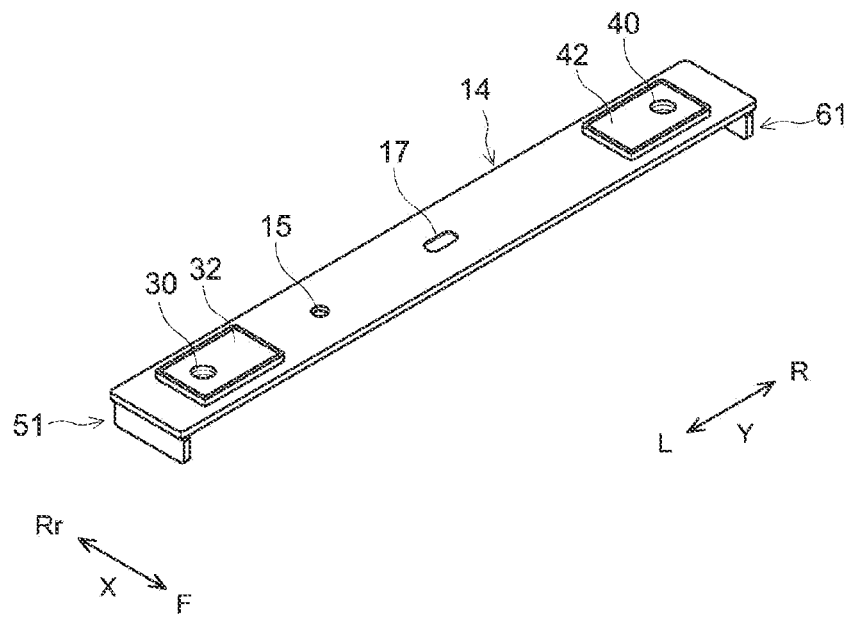
FIG. 11 is a schematic perspective view showing a seal plate with a positive electrode terminal, a negative electrode terminal, a positive electrode first collector part, a negative electrode first collector part, a positive electrode insulating member and a negative electrode insulating member attached thereto.
Figure 12:
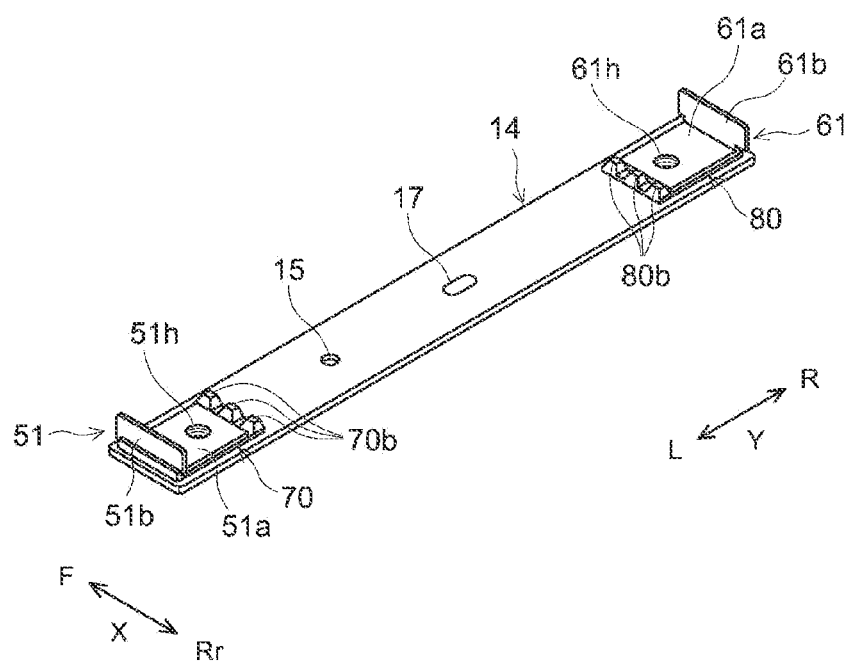
FIG. 12 is a perspective view showing the reverse side of the seal plate of FIG. 11.

FIG. 10 is a schematic partial expanded section showing the vicinity of the positive electrode terminal 30 in FIG. 2. FIG. 11 is a schematic perspective view showing the seal plate 14. FIG. 12 is a perspective view showing the reverse side of the seal plate of FIG. 11. FIG. 12 shows the side (inside) of the seal plate 14 facing the exterior housing 12. As shown in FIGS. 10 to 12, the positive electrode first collector part 51 is attached to the inside surface of the seal plate 14. The positive electrode first collector part 51 has a first area 51a and a second area 51b. The positive electrode first collector part 51 may be constituted by bending one member by pressing or the like or may be constituted by integrating multiple members by welding or the like. The positive electrode first collector part 51 here has been fixed to the seal plate 14 by riveting.

The first area 51a is a site that is disposed between the seal plate 14 and the electrode body group 20. The first area 51a extends in the long-side direction Y. The first area 51a extends horizontally along the inside surface of the seal plate 14. A positive electrode insulating member 70 is disposed between the seal plate 14 and the first area 51a. The first area 51a is insulated from the seal plate 14 by the positive electrode insulating member 70. The first area 51a here is electrically connected to the positive electrode terminal 30 by riveting. In the first area 51a, a through hole 51h passing through the collector in the vertical direction Z is formed at a position corresponding to the terminal outlet hole 18 of the seal plate 14. The second area 51b is a site disposed between the electrode body group 20 and a short-side wall 12c of the exterior housing 12. The second area 51b extends from one end of the first area 51a in the long-side direction Y (left end in FIG. 10) towards the short-side wall 12c of the exterior housing 12. The second area 51b extends in the vertical direction Z.

The positive electrode second collector part 52 extends along a short-side wall 12c of the exterior housing 12. As shown in FIG. 6, the positive electrode second collector part 52 has a collector plate connector 52a, an inclined part 52b, and a tab junction 52c. The collector plate connector 52a is a site that is electrically connected to the positive electrode first collector part 51. The collector plate connector 52a extends in the vertical direction Z. The collector plate connector 52a is disposed roughly perpendicular to the winding axis WL of the wound electrode bodies 20a, 20h and 20c. The collector plate connector 52a is provided with a recessed part 52d that is thinner than the surrounding parts. A through hole 52e passing through the connector in the short-side direction X is provided in the recessed part 52d. A joint with the positive electrode first collector part 51 is formed in the through hole 52e. The joint is a welded part formed by a welding method such as ultrasonic welding, resistance welding, laser welding or the like. The positive electrode second collector part 52 may also be provided with a fuse.

The tab junction 52c is a site that is attached to the positive electrode tab group 23 and electrically connected to the multiple positive electrode tabs 22t. As shown in FIGS. 5 and 6, the tab junction 52c extends in the vertical direction Z. The tab junction 52c is disposed roughly perpendicular to the winding axis WL of the wound electrode bodies 20a, 20h and 20c. The surface where the tab junction 52c is connected to the multiple positive electrode tabs 22t is disposed roughly parallel to the short-side wall 12c of the exterior housing 12, As shown in FIG. 4, a joint J with the positive electrode tab group 23 is formed on the tab junction 52c. The joint J is a welded part formed by a welding method such as ultrasound welding, resistance welding, laser welding or the like with the multiple positive electrode tabs 22t in a superimposed state for example. In the welded part, the multiple positive electrode tabs 22t are disposed closer to one side of the wound electrode bodies 20a, 20b and 20c in the short-side direction X. It is thus possible to more appropriately bend the multiple positive electrode tabs 22t, and stably form a curved positive electrode tab group 23 as shown in FIG. 4. The tab junction 52c is one example of the tab connection surface.

The inclined part 52b is a site connecting the bottom of the collector plate connector 52a to the top of the tab junction 52c. The inclined part 52b is inclined with respect to the collector plate connector 52a and the tab junction 52c. The inclined part 52b connects the collector plate connector 52a and the tab junction 52c in such a way that the collector plate connector is located more towards the center in the long-side direction Y than the tab junction 52c. It is thus possible to expand the space for holding the electrode body group 20 so that the energy density of the battery 100 can be increased. The lower end of the inclined part 52b (in other words, the end nearer the bottom wall 12a of the exterior housing 12) is preferably located below the lower end of the positive electrode tab group 23. It is thus possible to more appropriately bend the multiple positive electrode tabs 22t, and stably form a curved positive electrode tab group 23 as shown in FIG. 4.

The negative electrode collector part 60 constitutes a conductive pathway electrically connecting the negative electrode terminal 40 with the negative electrode tab group 25 composed of the multiple negative electrode tabs 24t. As shown in FIG. 2, the negative electrode collector part 60 is provided with a negative electrode first collector part 61 and a negative electrode second collector part 62. The negative electrode first collector part 61 and a negative electrode second collector part 62 may be made of the same metal species as the negative electrode current collector 24c, such as for example a conductive metal such as copper, copper alloy, nickel, or stainless steel. The negative electrode first collector part 61 and a negative electrode second collector part 62 may be configured in the same way as the positive electrode first collector part 51 and positive electrode second collector part 52 of the positive electrode collector part 50. The negative electrode collector part 60 is one example of the current collector, and the negative electrode second collector part 62 is one example of the tab connection surface.

As shown in FIG. 12, the negative electrode first collector part 61 has a first area 61a and a second area 61b. A negative electrode insulating member 80 is disposed between the seal plate 14 and the first area 61a. The first area 61a is insulated from the seal plate 14 by the negative electrode insulating member 80. In the first area 51a, a through hole 61h passing through the collector in the vertical direction Z is formed at a position corresponding to the terminal outlet hole 19 of the seal plate 14. As shown in FIG. 6, the negative electrode second collector part 62 has a collector plate connector 62a electrically connected to the negative electrode first collector part 61, an inclined part 62b, and a tab junction 62c that is attached to the negative electrode tab group 25 and electrically connected to the multiple negative electrode tabs 24t. The collector plate connector 62a is provided with a recessed part 62d connected to the tab junction 62c. The recessed part 62d is provided with a through hole 62e passing through the connector in the short-side direction X.

The positive electrode insulating member 70 is a member that insulates the seal plate 14 and the positive electrode first collector part 51. The positive electrode insulating member 70 has electrically insulating properties and resistance to the electrolytic solution used and is made of a resin material capable of elastic deformation. For example, it is preferably made of a polyolefin resin such as polypropylene (PP), a fluorine resin such as ethylene perfluoride-perfluoroalkoxy ethylene copolymer (PFA), or polyphenylene sulfide (PPS) or the like.

As shown in FIG. 2, the positive electrode insulating member 70 has a base 70a and multiple protrusions 70b. The base 70a and protrusions 70h are molded integrally in this case. The positive electrode insulating member 70 here is an integrally molded product made from one of the resin materials discussed above. It is thus possible to reduce the number of members used in comparison with cases in which the base 70a and protrusions 70b are separate members, thereby reducing costs. The positive electrode insulating member 70 can also be prepared more easily.

The base 70a is a site disposed between the seal plate 14 and the first area 51a of the positive electrode first collector part 51 in the vertical direction Z. The base 70a extends along the first area 51a of the positive electrode first collector part 51. As shown in FIG. 10, the base 70a has a through hole 70h passing through the base in the vertical direction Z. The through hole 70h is formed at a position corresponding to the terminal outlet hole 18 of the seal plate 14.

The multiple protrusions 70h each protrude from the base 70a on the side facing the electrode body group 20. As shown in FIG. 12, the multiple protrusions 70b are provided closer to the middle of the seal plate 14 (right side in FIG. 12) than the base 70a in the long-side direction Y. The multiple protrusions 70b are aligned along the short-side direction X. As shown in FIG. 3, the multiple protrusions 70b are roughly U-shaped in cross-section. The multiple protrusions 70b here face the curved parts 20r of the wound electrode bodies 20a, 20b and 20c constituting the electrode body group 20. It is thus possible to avoid damage to the wound electrode bodies 20a, 20b and 20c from the protrusions 70b pressing against their end faces.

The number of the protrusions 70b is the same as the number of the wound electrode bodies 20a, 20b and 20c constituting the electrode body group 20, or in other words 3. The protrusions 70h can thus be made to face the wound electrode bodies 20a, 20b and 20c more reliably, and the effects of the technology disclosed here can be better achieved. Furthermore, the wound electrode bodies 20a, 20b and 20c and the protrusions 70b can be brought into well-balanced contact in the insertion step discussed below. However, the number of the protrusions 70b may also be different from the number of electrode bodies constituting the electrode body group 20, such as 1 for example.

As shown in FIG. 2, the negative electrode insulating member 80 is disposed symmetrically to the positive electrode insulating member 70 with respect to the center CL of the electrode body group 20 in the long-side direction Y. The negative electrode insulating member 80 may be constituted in the same way as the positive electrode insulating member 70. Like the positive electrode insulating member 70, the negative electrode insulating member 80 here has a base 80a disposed between the seal plate 14 and the negative electrode first collector part 61, together with multiple protrusions 80b.

Method for Manufacturing Battery 100

The use of a positive electrode 22 and/or a negative electrode 24 such as the aforementioned is a feature of the battery 100 manufacturing method. Other manufacturing processes may be similar to conventional processes. In addition to such a positive electrode 22 and/or negative electrode 24, the battery 100 may be manufactured by a manufacturing method that includes such a separator 26, preparing a battery case 10 (exterior housing 12 and seal plate 14), an electrolytic solution, a positive electrode terminal 30, a negative electrode terminal 40, a positive electrode collector part 50 (positive electrode first collector part 51 and positive electrode second collector part 52), a negative electrode collector part 60 (negative electrode first collector part 61 and negative electrode second collector part 62), a positive electrode insulating member 70, and a negative electrode insulating member 80, followed by a winding step, a first attachment step, a second attachment step, an insertion step, and a sealing step in that order for example. Other steps may also be included at any stage of the manufacturing method disclosed here.

In the winding step, as shown in FIG. 7, a wound electrode body 20a is prepared comprising a strip-shaped positive electrode 22, a strip-shaped negative electrode 24 and strip-shaped separators 26. Specifically, first the positive electrode 22, the negative electrode 24 and the separators 26 are superimposed, and a winding apparatus is prepared comprising a winding unit that winds in the winding direction and a cutting unit that cuts the strip-shaped positive electrode 22 and/or negative electrode 24 to a predetermined length (winding length). The cutting unit is provided with a detection mechanism and a cutting part as described above. Next, the ends of the two strip-shaped separators 26 are fixed to the winding core of the winding unit. That is, the two separators 26 are pinched by the winding core. Next, a strip-shaped positive electrode 22 having multiple positive electrode tabs 22t and a strip-shaped negative electrode 24 having multiple negative electrode tabs 24t are prepared. The multiple positive electrode tabs 22t and the multiple negative electrode tabs 24t each include a detection tab 27 having a predetermined straight part 27S and multiple normal tabs 28a to 28e lacking the predetermined straight part 27S.

Next, the strip-shaped positive electrode 22 and the strip-shaped negative electrode 24 are supplied as the winding core is turned to wind the positive electrode 22 and negative electrode 24 with the separators 26 in between. During this process, the position of the straight part 27S of the detection tab 27 is detected by the detection mechanism of the cutting unit and used as a reference position. The detection mechanism is for example a laser detection mechanism having an emitting part that emits laser light and a receiving part that receives laser light. The positive electrode 22 and negative electrode 24 are then each cut with the cutting part of the cutting unit at a cutting position at a predetermined cutting length from the reference position.

Figure 13:
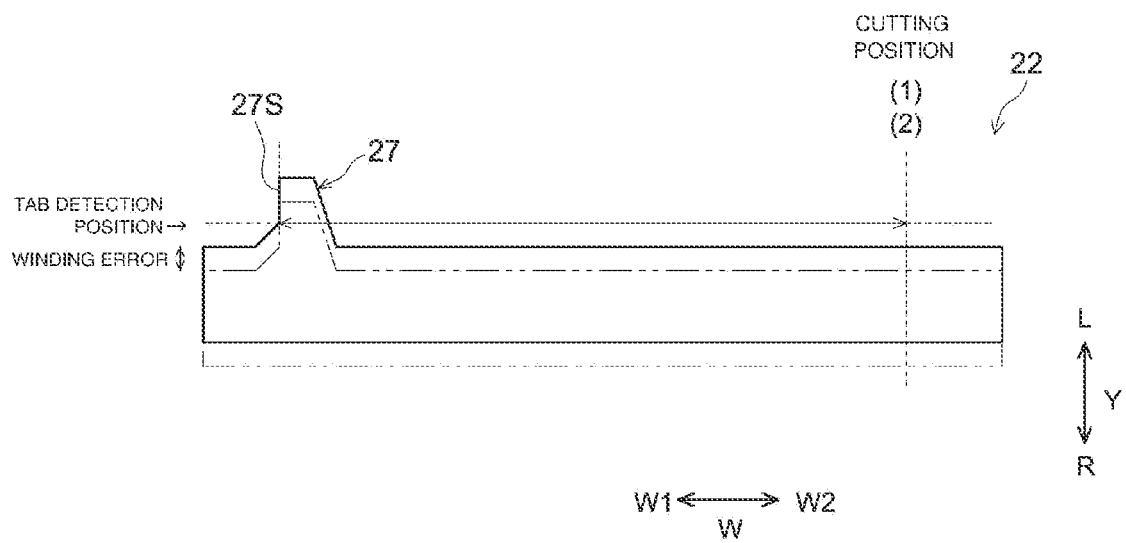
FIG. 13 is a schematic plane view of the winding step of one embodiment.

FIG. 13 is a schematic plane view of a positive electrode 22 winding step. As shown by the virtual line in FIG. 13, a winding error may occur due to movement of the positive electrode 22 in the height direction Y in the winding step. With the technology disclosed here, however, the multiple positive electrode tabs 22t include a detection tab 27. This means that even if winding error occurs, the position of the detection tab 27 as detected by the detection mechanism is less likely to vary in the longitudinal direction W. As a result, the position of cutting is the same at the cutting position (1) and the cutting position (2), and the positive electrode 22 can be cut at the accurate position. Consequently, variation in the positions of the multiple positive electrode tabs 22t in the short-side direction X is suppressed in the battery 100, and the positive electrode tabs 22t can be brought together to favorably form the positive electrode tab group 23.

A first assemblage such as that shown in FIGS. 11 and 12 is prepared in the first attachment step. Specifically, first the positive electrode terminal 30, the positive electrode first collector part 51, the positive electrode insulating member 70, the negative electrode terminal 40, the negative electrode first collector part 61, and the negative electrode insulating member 80 are attached to the seal plate 14.

The positive electrode terminal 30, the positive electrode first collector part 51 and the positive electrode insulating member 70 are fixed to the seal plate 14 by riveting for example. As shown in FIG. 10, riveting is accomplished with a gasket 90 sandwiched between the outer surface of the seal plate 14 and the positive electrode terminal 30, and the positive electrode insulating member 70 sandwiched between the inner surface of the seal plate 14 and the positive electrode first collector part 51. The gasket 90 may be made of a similar material as the positive electrode insulating member 70. Specifically, the positive electrode terminal 30 before riveting is inserted from above the seal plate 14 into the through hole 90h of the gasket 90, the terminal outlet hole 18 of the seal plate 14, the through hole 70h of the positive electrode insulating member 70 and the through hole 51h of the positive electrode first collector part 51, in that order, so that it protrudes below the seal plate 14. The part of the positive electrode terminal 30 that protrudes below the seal plate 14 is then riveted by applying compressive force in the vertical direction Z. A rivet tail 30c is thus formed at the end of the positive electrode terminal 30 (lower end in FIG. 2).

This riveting serves to fix the gasket 90, seal plate 14, positive electrode insulating member 70 and positive electrode first collector part 51 together as a whole with the seal plate 14, while also sealing the terminal outlet hole 18. The rivet tail 30c may also be welded to the positive electrode first collector part 51. It is thus possible to improve connective reliability.

The negative electrode terminal 40, negative electrode first collector part 61 and negative electrode insulating member 80 may be fixed in the same way as the positive electrode side above. That is, the negative electrode terminal 40 before riveting is inserted from above the seal plate 14 into the gasket through hole, the terminal outlet hole 19 of the seal plate 14, the through hole of the negative electrode insulating member 80 and the through hole of the negative electrode first collector part 61, in that order, so that it protrudes below the seal plate 14. The part of the negative electrode terminal 40 that protrudes below the seal plate 14 is then riveted by applying compressive force in the vertical direction Z. A rivet tail 40c is thus formed at the end of the negative electrode terminal 40 (lower end in FIG. 2).

Next, a positive electrode external conduction member 32 and a negative electrode external conduction member 42 are attached via an external insulating member 92 to the outside surface of the seal plate 14. The material of the external insulating member 92 may be similar to that of the positive electrode insulating member 70. The positive electrode external conduction member 32 and negative electrode external conduction member 42 may also be attached after the insertion step (such as after sealing the liquid injection hole 15).

In the second attachment step, a second assemblage such as that shown in FIG. 5 is prepared using the first assemblage prepared in the first attachment step. Specifically, three wound electrode bodies 20a each having an attached positive electrode second collector part 52 and negative electrode second collector part 62 are prepared as shown in FIG. 6 and arrayed in the short-side direction X as the wound electrode bodies 20a, 20b and 20c. At this time, the wound electrode bodies 20a, 20b and 20c are disposed in a row with the positive electrode second collector part 52 of each on one side in the long-side direction V (left side in FIG. 5) and the negative electrode second collector part 62 on the other side in the long-side direction Y (right side in FIG. 5).

Next, the positive electrode first collector part 51 fixed on the seal plate 14 (specifically the second area 51b) is joined to the positive electrode second collector parts 52 (specifically the collector plate connectors 52a) of each of the wound electrode bodies 20a, 20b and 20c with the multiple positive electrode tabs 22t in a curved state as shown in FIG. 4. The negative electrode first collector part 61 fixed on the seal plate 14 is also joined to the negative electrode second collector parts 62 of each of the wound electrode bodies 20a, 20b and 20c with the multiple negative electrode tabs 24t of the negative electrode tab group 25 in a curved state. The joining method may be welding method such as ultrasound welding, resistance welding or laser welding. It is desirable to employ a method of welding by exposure to a high energy beam from a laser or the like. This welding treatment forms joins on both the recessed part 52d of the positive electrode second collector part 52 and the recessed part 62d of the negative electrode second collector part 62.

Figure 14:
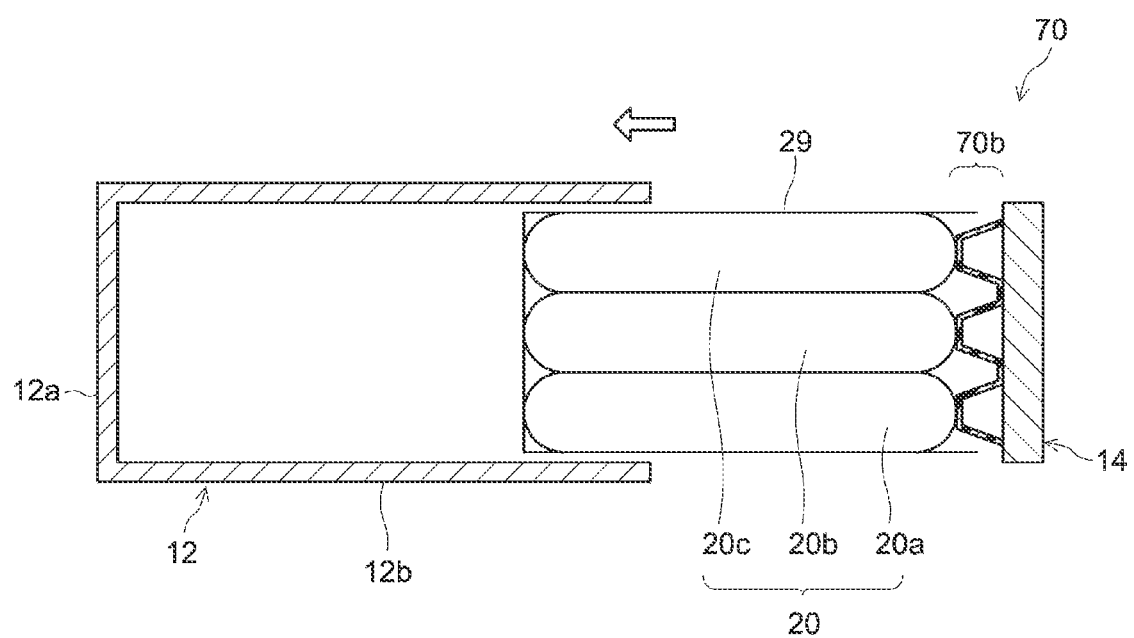
FIG. 14 is a schematic cross-section explaining the battery insertion step of one embodiment.

In the insertion step, the electrode body group 20 that has been integrated with the seal plate 14 is housed in the internal space of the exterior housing 12. FIG. 14 is a schematic cross-section explaining the insertion step. First, an insulating resin sheet made of a resin material such as polyethylene (PE) is bent into a bag or box shape to prepare an electrode body holder 29. The electrode body group 20 is then housed in the electrode body holder 29. The electrode body group 20 covered with the electrode body holder 29 is then inserted into the exterior housing 12. When the electrode body group 20 is heavy, with a weight of at least 1 kg, or at least 1.5 kg, or 2 to 3 kg for example, the electrode body group 20 may be inserted into the exterior housing 12 with the exterior housing 12 arranged so that the long-side wall 12b is perpendicular to the direction of gravity (with the exterior housing 12 sideways) as shown in FIG. 14.

The curved parts 20r of the wound electrode bodies 20a, 20b and 20c constituting the electrode body group 20 are pushed into the interior of the exterior housing 12 by the protrusions 70b of the positive electrode insulating member 70 and/or the protrusions Sob of the negative electrode insulating member 80. Load on the positive electrode tab group 23 and/or the negative electrode tab group 25, and particularly load near the bases of the positive electrode tabs 22t, can be reduced by pushing the electrode body group 20 with the protrusions 70b and/or the protrusions 80b.

The positive electrode tab group 23 and/or the negative electrode tab group 25 has a play of movement in the direction perpendicular to the direction of protrusion (typically the vertical direction Z). Consequently, when the exterior housing 12 is raised so that the seal plate 14 is on top after the electrode body group 20 is inserted into the exterior housing 12, the electrode body group 20 moves downwards slightly due to gravity. As shown in FIG. 3, this causes the protrusions 70b of the positive electrode insulating member 70 to be separated from the wound electrode bodies 20a, 20b and 20c. It also causes the protrusions Sob of the negative electrode insulating member 80 to be separated from the wound electrode bodies 20a, 20h and 20c.

In the sealing step, the seal plate 14 is joined to the edge of the opening 12h in the exterior housing 12, sealing the opening 12h. Joining of the seal plate 14 can be accomplished by welding such as laser welding for example. An electrolytic solution is then injected from the liquid injection hole 15, and the liquid injection hole 15 is closed with the seal member 16, sealing the battery 100.

The battery 100 can be manufactured as described above.

The battery 100 can be used for various applications, and for example can be used favorably as a power source (driving power source) of a motor mounted on a vehicle such as a passenger car or truck. The type of vehicle is not particularly limited and may be a plug-in hybrid electric vehicle (PHEW), hybrid electric vehicle (HEV), battery electric vehicle (BEV) or the like for example. The battery 100 can be used favorably for constructing an assembled battery.

Certain embodiments of the technology disclosed here were explained above, but these embodiments are only examples. The technology disclosed here can also be implemented in various other forms. The technology disclosed here can be implemented based on the content disclosed in this Description and on technical common knowledge in the field. The technology described in the claims encompasses various changes and modifications to the embodiments given as examples above. Fax example, parts of the embodiments may be replaced with other modified examples, or other modified examples may be added to the above embodiments. Furthermore, if a technical feature is not explained as an essential feature, it may be omitted as appropriate.

For example, in the above embodiments the detection tab 27 was pentagonal and had one straight part 27S. The straight part 27S constituted a part of the side extending from the base in the height direction Y on the leading end W1. However, this is not a limitation. The shape of the detection tab 27 may also be a square shape such as a square, rectangle or trapezoid for example. One detection tab 27 may also have multiple straight parts 27S. FIGS. 15A to 15D are schematic plane views showing detection tabs 127, 227, 327 and 427 of modified examples.

Figure 15A:
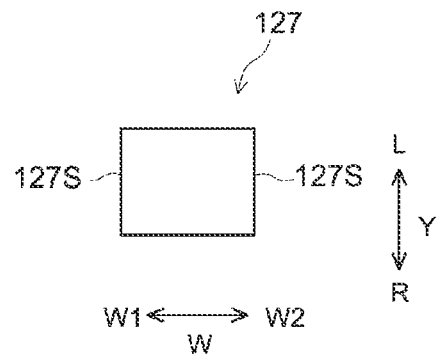
FIGS. 15A, 15B, 15C and 15D are each schematic plane views of detection tabs of modified examples.
Figure 15B:
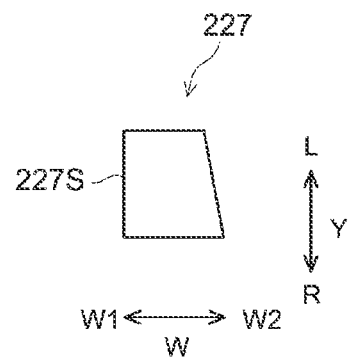
Figure 15C:
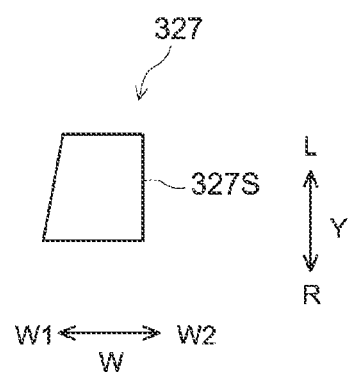
Figure 15D:
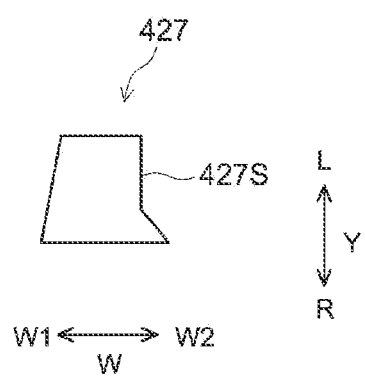

The detection tab 127 shown in FIG. 15A is rectangular. The detection tab 127 has a pair of (two) straight parts 127S. The detection tabs 227 and 327 shown in FIGS. 15B and 15C are right-angle trapezoids. The detection tabs 227 and 327 each have one straight part 227S and 327S. In the detection tab 227 shown in FIG. 15B, the straight part 227S constitutes the side extending in the height direction Y from the base on the leading end W1. In the detection tab 327 shown in FIG. 15c, the straight part 327S constitutes the side extending in the height direction Y from the base on the trailing end W2. The detection tab 427 shown in FIG. 15D is pentagonal. In the case of the detection tab 427, the straight part 427S constitutes part of the side extending in the height direction Y from the base on the trailing end W2.

Furthermore, for example in the above embodiments the detection tab 27 was provided 1 tab per superimposition as shown in FIG. 9. The normal tabs 28a to 28e had different sizes (specifically, different tab heights). Specifically, the normal tabs 28a to 28e were provided so that the heights in the long-side direction Y declined gradually from one end to the other of the wound electrode body 20a in the short-side direction X. However, these are not limitations. FIGS. 16A, 16B, 17A and 17B are schematic plane views showing electrodes 122 and 222 of modified examples.

Figure 16:
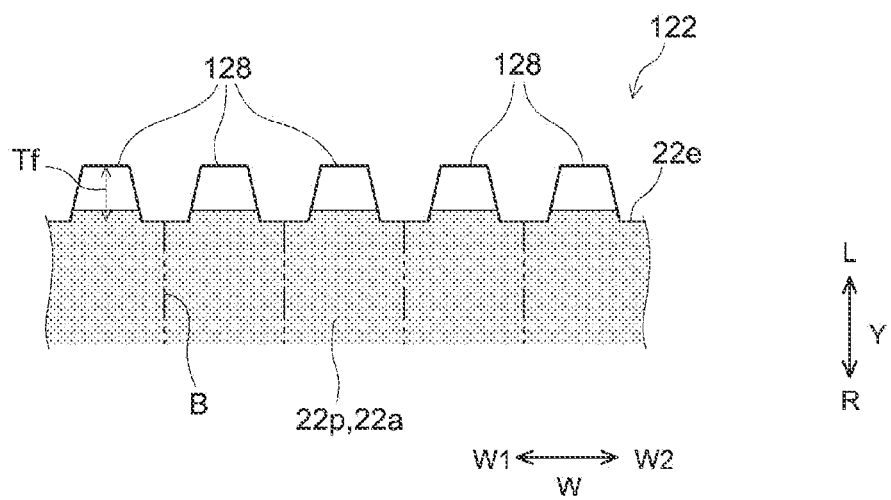
FIG. 16A is a schematic plane view of a positive electrode having normal tabs of a first modified example and FIG. 16B is a view corresponding to FIG. 9 showing a positive electrode of the first modified example.
Figure 16:
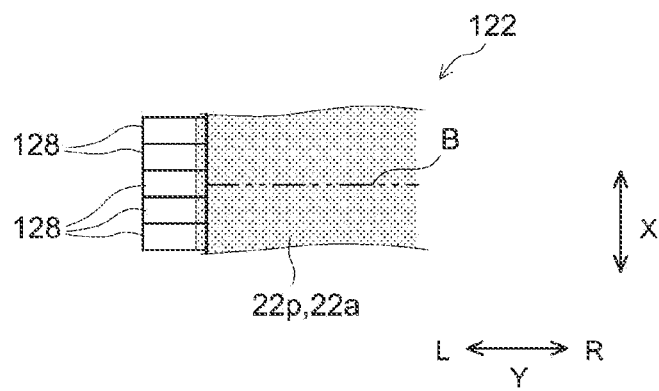

The positive electrode 122 shown in FIGS. 16A and 16B has multiple normal tabs 128. As shown in the plane view of FIG. 16A, the multiple normal tabs 128 all have the same tab height Tf. When the positive electrode 122 is wound, the lengths in the long-side direction Y are aligned as shower in the partial cross-section of FIG. 16B. For example, such an embodiment can be adopted by preference when the positive electrode is installed in the battery case 10 without curving the multiple positive electrode tabs or the like.

Figure 17A:
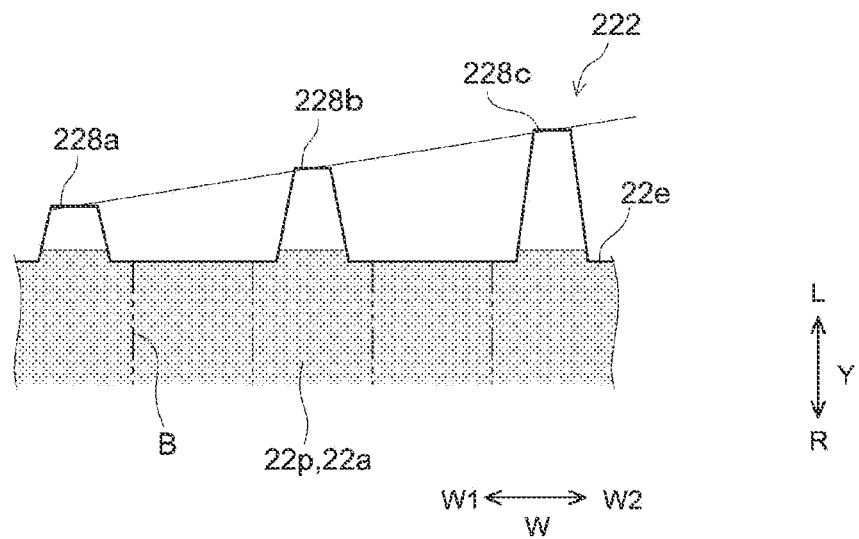
FIG. 17A is a schematic plane view of a positive electrode having normal tabs of the second modified example and FIG. 17B is a view corresponding to FIG. 9 showing a positive electrode of the second modified example.
Figure 17B:
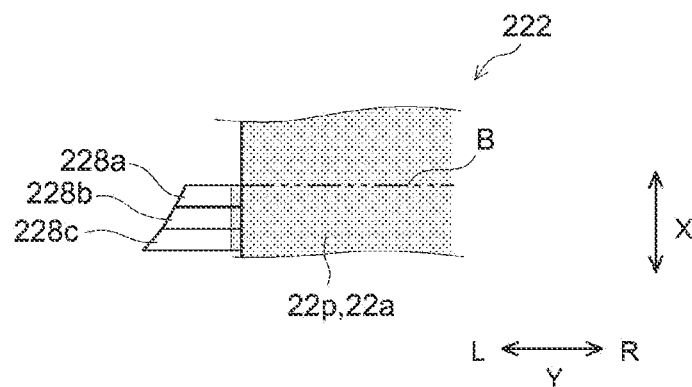

The positive electrode 222 shown in FIGS. 17A and 17B has multiple normal tabs 228a, 228b and 228c As shown in the plane view of FIG. 17A, the normal tabs 228a, 228b and 228c alternate with regions defined by bending points B. The number of normal tabs 228a, 228b and 228c is half the number of superimpositions of the positive electrode 22 (0.5 tabs/1 superimposition). That is, the number of normal tabs 228a, 228b and 228c is 2 tabs/wind (turn). Like the odd-numbered normal tabs 28c and 28e of the positive electrode 22, the multiple normal tabs 228a, 228b and 228c increase gradually in tab height from the leading end W1 to the trailing end W2. As shown in the partial cross-section of FIG. 17B, the lengths in the long-side direction Y grow gradually longer when the positive electrode 222 is wound. In the positive electrode 222 shown in FIG. 17A, the tab heights increase gradually from the leading end W1 to the trailing end W2, but as in the case of the normal tabs 28b and 28d of the positive electrode 22, the tab heights may also decline gradually from the leading end W1 to the trailing end W2.

Furthermore, in the battery 100 of the above embodiments the positive electrode protective layer 22p was formed on part of the positive electrode tabs 22t (detection tab 27 and normal tabs 28a to 28e) and the negative electrode active material layer 24a was formed on part of the negative electrode tabs 24t. However, this is not a limitation. The positive electrode active material layer 22a may also be formed on part of the positive electrode tabs 22t. Alternatively, the positive electrode tabs 22t may be formed from an exposed part of the positive electrode current collector 22c, or the negative electrode tabs 24t may be formed from an exposed part of the negative electrode current collector 24c.

What is claimed is:

1. A battery comprising:
one or more wound electrode bodies each composed of a strip-shaped first electrode plate and a strip-shaped second electrode plate superimposed and wound together with a strip-shaped separator between the two; and
a battery case containing the wound electrode body or bodies, wherein
the first electrode plate has multiple electrode tabs protruding from an edge extending in the longitudinal direction, and
the multiple electrode tabs include a first electrode tab having a straight part that is roughly perpendicular to the edge and has a length of at least 2 mm in the direction orthogonal to the edge, and second electrode tabs lacking the straight part.

2. The battery according to claim 1, wherein at least one of the second electrode tabs is longer than the first electrode tab in the direction orthogonal to the longitudinal direction, and a base of the at least one of the second electrode tabs contiguous with the edge is also longer than a base of the first electrode tab in the longitudinal direction.

3. The battery according to claim 1, wherein at least one of the second electrode tabs is shorter than the first electrode tab in the direction orthogonal to the longitudinal direction, and a base of the at least one of the second electrode tabs contiguous with the edge is also shorter than a base of the first electrode tab in the longitudinal direction.

4. The battery according to claim 1, wherein the first electrode tab has an asymmetrical shape in the longitudinal direction.

5. The battery according to claim 1, wherein the first electrode tab has an inclined part or curved part that is inclined relative to the straight part and is located between the straight part and the base contiguous with the edge in the direction perpendicular to the longitudinal direction.

6. The battery according to claim 5, wherein the length of the first electrode tab from the base to the straight part is at least 4 mm.

7. The battery according to claim 1, wherein given La as a straight line extending in the longitudinal direction and passing through one end of the straight part in the protrusion direction of the first electrode tab, and Lb as a straight line extending in the longitudinal direction and passing through the other end of the straight part in the protrusion direction of the first electrode tab, the first electrode tab includes a region with a length of at least 10 mm in the longitudinal direction and a length of at least 3 mm in the direction perpendicular to the longitudinal direction between the straight line La and the straight line Lb.

8. The battery according to claim 1, wherein
the battery case comprises an exterior housing having a bottom wall, a pair of first side walls extending from the bottom wall and facing each other, a pair of second side walls extending from the bottom wall and facing each other, and an opening facing the bottom wall, and a seal plate that seals the opening in the exterior housing, and is also provided with an electrode terminal fixed to the seal plate and a current collector that electrically connects the electrode terminal with the first electrode tab, and the multiple electrode tabs are superimposed at the end of the wound electrode body in the direction extending along the first side walls, and the current collector has a tab connection surface where the first electrode tab is connected at the end in the direction extending along the first side walls.

9. The battery according to claim 1, wherein there are multiple wound electrode bodies.

10. The battery according to claim 1, wherein the number of the electrode tabs relative to the number of superimpositions of the first electrode plate is at least 0.8.

11. The battery according to claim 1, wherein:
at least one of the second electrode tabs is longer than the first electrode tab in the direction orthogonal to the longitudinal direction, and a base of the at least one of the second electrode tabs contiguous with the edge is also longer than a base of the first electrode tab in the longitudinal direction, and at least one of the second electrode tabs is shorter than the first electrode tab in the direction orthogonal to the longitudinal direction, and a base of the at least one of the second electrode tabs contiguous with the edge is also shorter than a base of the first electrode tab in the longitudinal direction.

* * * * *